(12) United States Patent
Zeiler et al.

(10) Patent No.: US 12,145,674 B2
(45) Date of Patent: Nov. 19, 2024

(54) ELECTRIC OUTDOOR RIDE-ON POWER EQUIPMENT

(71) Applicant: Briggs & Stratton, LLC, Wauwatosa, WI (US)

(72) Inventors: Jeffrey Zeiler, Wauwatosa, WI (US); David Schulenberg, Sussex, WI (US); Scott Funke, New Berlin, WI (US); Steve Avery, Wauwatosa, WI (US); Steve Weber, Wauwatosa, WI (US); Brian Poirier, Wauwatosa, WI (US); Jacob Schmalz, Milwaukee, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 801 days.

(21) Appl. No.: 16/365,526

(22) Filed: Mar. 26, 2019

(65) Prior Publication Data

US 2019/0291779 A1   Sep. 26, 2019

Related U.S. Application Data

(60) Provisional application No. 62/648,115, filed on Mar. 26, 2018.

(51) Int. Cl.
*B60K 1/02* (2006.01)
*A01D 34/00* (2006.01)
(Continued)

(52) U.S. Cl.
CPC ............ *B62D 6/08* (2013.01); *A01D 34/008* (2013.01); *A01D 34/66* (2013.01); *A01D 34/78* (2013.01);
(Continued)

(58) Field of Classification Search
CPC ...... A01D 34/008; A01D 34/66; A01D 34/78; A01D 69/02; B60K 1/02; B60K 1/04; B60K 2001/0416; B60K 2007/0038; B60K 2007/0092; B60K 7/0007; B60Y 2200/223; B62D 6/08; B62D 1/12; B62D 9/002; B62D 11/003; H01Q 1/27
(Continued)

(56) References Cited

U.S. PATENT DOCUMENTS 5,497,604 A   3/1996   Lonn
5,502,957 A   4/1996   Robertson
(Continued)

FOREIGN PATENT DOCUMENTS

DE         4137162 A1 *   5/1993   ............ A01D 34/78
WO    WO-2016/002081         1/2016
(Continued)

*Primary Examiner* — Kevin Hurley
*Assistant Examiner* — Felicia L. Brittman-Alabi
(74) *Attorney, Agent, or Firm* — Foley & Lardner LLP

(57) ABSTRACT

Ride-on outdoor power equipment includes one or more batteries, one or more electric traction motors electrically connected to the one or more batteries, one or more user input devices, a plurality of sensors, and a controller in communication with the one or more batteries, the electric traction motors and the one or more user input devices, the controller configured to control the electric traction motors to operate the ride-on outdoor power equipment based on inputs received via the user input devices.

20 Claims, 9 Drawing Sheets

(51) Int. Cl.
*A01D 34/66* (2006.01)
*A01D 34/78* (2006.01)
*B60K 1/04* (2019.01)
*B62D 1/12* (2006.01)
*B62D 6/08* (2006.01)
*B62D 9/00* (2006.01)
*B62D 11/00* (2006.01)
*H01Q 1/27* (2006.01)

(52) U.S. Cl.
CPC ............... *B60K 1/02* (2013.01); *B60K 1/04* (2013.01); *B62D 1/12* (2013.01); *B62D 9/002* (2013.01); *B62D 11/003* (2013.01); *H01Q 1/27* (2013.01); *B60K 2001/0416* (2013.01)

(58) Field of Classification Search
USPC ........................................................ 180/6.5
See application file for complete search history.

(56) References Cited

U.S. PATENT DOCUMENTS

| | | | |
|---|---|---|---|
| 5,934,051 A | 8/1999 | Hahn | |
| 6,230,089 B1 | 5/2001 | Lonn et al. | |
| 6,591,593 B1 | 7/2003 | Brandon et al. | |
| 6,688,090 B2 | 2/2004 | Velke et al. | |
| 6,750,622 B2 | 6/2004 | Simizu et al. | |
| 8,209,693 B2 | 6/2012 | Matsuo | |
| 8,234,026 B2 | 7/2012 | Wyatt et al. | |
| 8,240,414 B2 | 8/2012 | Sasahara et al. | |
| 8,657,041 B2 | 2/2014 | Ishii et al. | |
| 8,668,036 B2 | 3/2014 | Wyatt et al. | |
| 8,668,043 B2 | 3/2014 | Yang et al. | |
| 8,966,870 B2 | 3/2015 | Mackinnon et al. | |
| 9,210,839 B2 | 12/2015 | Schygge et al. | |
| 9,282,695 B2 | 3/2016 | Goto | |
| 9,313,948 B2 | 4/2016 | Moriguchi et al. | |
| 9,380,741 B2 | 7/2016 | Drew et al. | |
| 9,699,965 B2 | 7/2017 | Schygge et al. | |
| 9,840,143 B1 | 12/2017 | Keller et al. | |
| 9,950,621 B2 | 4/2018 | Dwyer | |
| 9,980,434 B1 | 5/2018 | Brown | |
| 10,058,031 B1 * | 8/2018 | Brown | B60R 16/0231 |
| 10,091,936 B2 | 10/2018 | Laurin et al. | |
| 10,093,169 B1 | 10/2018 | Keller et al. | |
| 10,292,326 B2 | 5/2019 | Tanabe et al. | |
| 10,327,392 B2 | 6/2019 | Conrad et al. | |
| 10,687,464 B2 | 6/2020 | Zeiler et al. | |
| 2005/0230168 A1 | 10/2005 | Fillman et al. | |
| 2009/0065273 A1 | 3/2009 | Wyatt et al. | |
| 2009/0201650 A1 | 8/2009 | Hauser et al. | |
| 2011/0309674 A1 * | 12/2011 | Kamachi | B60L 55/00 180/65.21 |
| 2012/0159916 A1 | 6/2012 | Ishii et al. | |
| 2012/0227368 A1 | 9/2012 | Koike et al. | |
| 2012/0260617 A1 | 10/2012 | Gilpatrick | |
| 2013/0047565 A1 | 2/2013 | Shida et al. | |
| 2013/0110351 A1 | 5/2013 | Stone et al. | |
| 2013/0173117 A1 | 7/2013 | Bertsch et al. | |
| 2013/0268165 A1 | 10/2013 | Hashima et al. | |
| 2014/0165524 A1 | 6/2014 | Schygge et al. | |
| 2015/0006025 A1 | 1/2015 | Rhoades et al. | |
| 2015/0214864 A1 | 7/2015 | Sopko | |
| 2016/0083073 A1 | 3/2016 | Beckman | |
| 2016/0183451 A1 | 6/2016 | Conrad et al. | |
| 2018/0192580 A1 | 7/2018 | Zeiler et al. | |
| 2018/0235149 A1 | 8/2018 | Ito et al. | |
| 2018/0249630 A1 | 9/2018 | Mullet et al. | |
| 2018/0310471 A1 | 11/2018 | Pellenc | |
| 2018/0338417 A1 | 11/2018 | Matsuda et al. | |
| 2019/0230850 A1 * | 8/2019 | Johnson | G05D 1/0088 |
| 2019/0269067 A1 | 9/2019 | Fukano et al. | |
| 2020/0163275 A1 | 5/2020 | Zhao et al. | |
| 2020/0353977 A1 | 11/2020 | Davies et al. | |
| 2020/0363796 A1 | 11/2020 | Muro et al. | |

FOREIGN PATENT DOCUMENTS

| | | |
|---|---|---|
| WO | WO-2017/109319 | 6/2017 |
| WO | WO-2017/222368 | 12/2017 |

* cited by examiner

ELECTRIC OUTDOOR RIDE-ON POWER EQUIPMENT

CROSS-REFERENCE TO RELATED PATENT APPLICATIONS

This application claims the benefit of U.S. Application No. 62/648,115, filed Mar. 26, 2018, which is incorporated herein by reference in its entirety.

BACKGROUND

The present disclosure relates to electrically powered outdoor power equipment and the control thereof. Presently, most outdoor power equipment utilizes a fossil fuel based power source, such as a gasoline powered internal combustion engine. However, these fossil fuel powered devices may be limited in the type of control and features that many users have become accustomed to. Further, regulations from various countries and agencies require fossil fuel based engines to be modified to meet emissions and other standards, resulting in cost increases of the fossil fuel based engine. An all-electric power train for outdoor power equipment provides solutions to the above.

SUMMARY

The present disclosure relates to a ride-on outdoor power equipment including one or more batteries, and a number of electric motors. The ride-on outdoor power equipment further includes a number of user input devices, a number of sensors, and a controller. The controller is in communication with the batteries, the electric motors, and the one or more user input devices. The controller is configured to control the electric motors to operate the ride-on outdoor power equipment based on inputs received via the user input devices.

Another embodiment describes ride-on outdoor power equipment having one or more batteries and one or more electric traction motors electrically connected to the batteries. The zero radius turn lawn mower further includes one or more user input devices, a number of sensors, and a controller. The controller is in communication with the batteries, the electric traction motors, and the one or more user input devices. The controller is configured to control the electric motors to operate the ride-on outdoor power equipment based on inputs received via the user input devices.

Another embodiment describes a zero-turn radius mower having multiple electric motors, one or more user input devices, multiple sensors, and a controller in communication with the one or more batteries, the electric motors and the one or more user input devices. The controller is configured to control the electric motors to operate the ride-on outdoor power equipment based on inputs received via the user input devices.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

The present disclosure is directed to battery powered outdoor power equipment. The figures depict a zero-turn ride on lawn mower (ZTR), control schemes, and associated processes. However, it should be understood that the battery powered outdoor power equipment could be configured to function as other types of outdoor power equipment, including stand-on mowers, lawn tractors, walk-behind mowers, all-terrain vehicles, loaders, thatchers, edge trimmers, seeders, sprayers, snow throwers, sod cutters, power rakes, overseeders, aerators, sod cutters, brush mowers, spreaders, etc.

Figure 1:
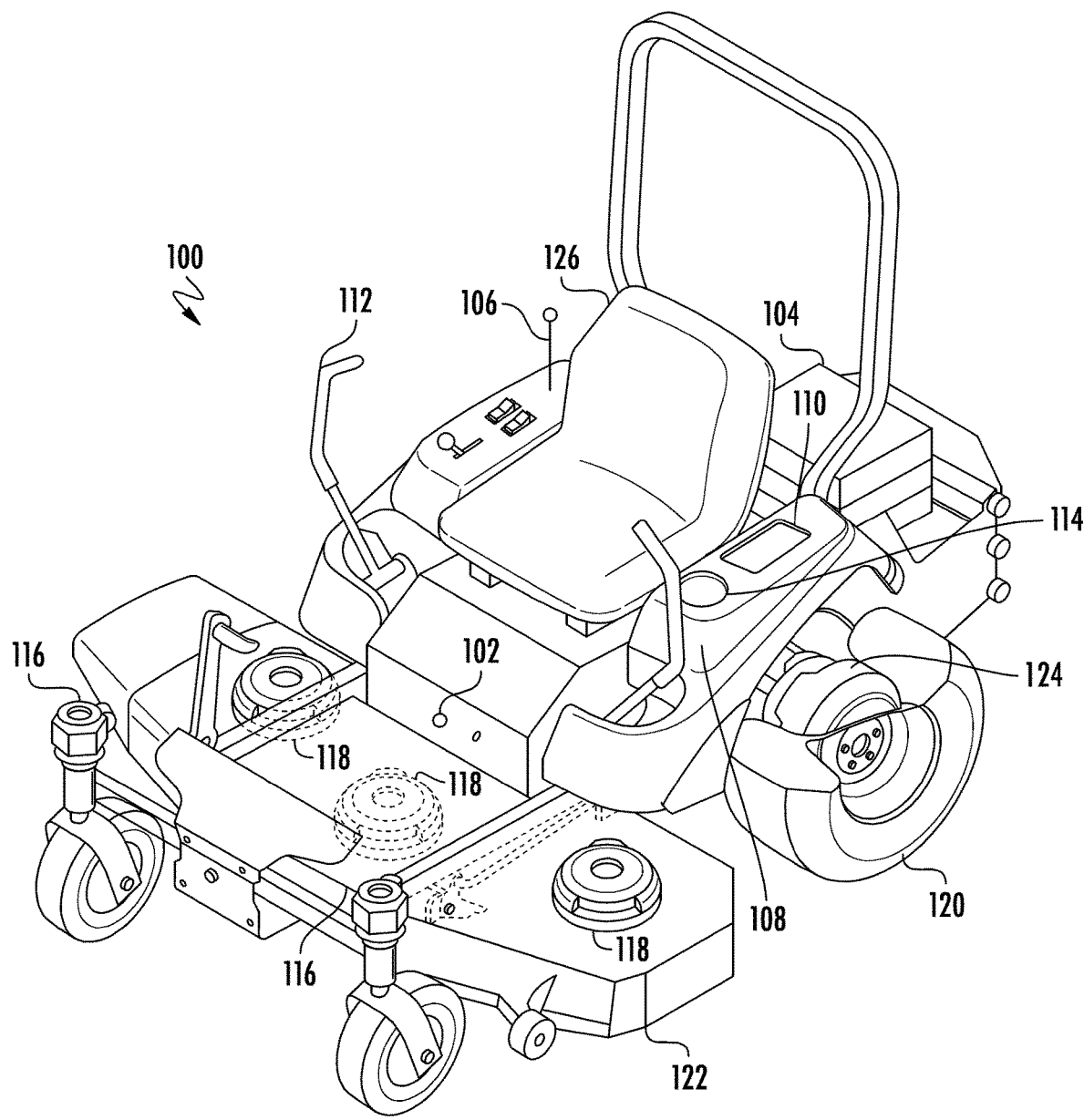
FIG. 1 is a front perspective view of an electric outdoor power equipment in the form of an electric zero turn radius ride-on mower, according to some embodiments.

FIG. 1 illustrates a battery powered outdoor power equipment in the form of a battery powered zero-radius turn ride-on mower (ZTR) 100. While the outdoor power equipment is shown as ZTR 100, it is contemplated that the outdoor power equipment can also be operated as other lawn care devices, such as those described above.

The ZTR 100 may include a number of sensors 102, one or more removable batteries 104, one or more antennas 106, one or more controllers 108, one or more user interfaces 110, and one or more input devices 112. The ZTR 100 may further include a number of electric motors. In one embodiment, the motors may be brushless DC motors. However, in other embodiments, the motors may be AC motors, permanent magnet motors, etc. As shown in FIG. 1, the ZTR 100 may have one or more traction motors 114, one or more hub motors 116, and/or one or more implement motors 118. In some embodiments, the ZTR 100 may have a traction motor 114 for each of the rear drive wheels 120. In further embodiments, the ZTR 100 may have a hub motor 116 for each non-traction wheel (e.g. hub or castor wheels), as shown in FIG. 1. The hub motors may allow for the non-traction wheels to be positioned or locked into position when operation the ZTR 100 in certain modes, as will be described in more detail below.

In some embodiments, the ZTR 100 may have one or more attachment motors 118, as stated above. The attachment motors may be used to drive one or more attachments associated with the ZTR 100. In some embodiments, the attachment motors 118 may each drive a cutting implement, such as a rotating blade. However, in other examples, the attachment motors 118 may be used to drive other attachments such as spreaders, blowers, power rakes, or other applicable attachments. As shown in FIG. 1, the attachment motors are located on a mowing deck 122. The mowing deck 122 may house the attachment motors 118 and one or more cutting blades attached to each of the attachment motors. In some embodiments, the attachment motors 118 may be connected via a central bus. The central bus may provide power and communications to and from other devices, such as the controller 108 and/or the batteries 104. In some embodiments, the central bus may allow for a single connection from the mowing deck 122 to the body of the ZTR 100. The computing power used for the ZTR 100 is distributed across all controllers 108 and controller modules. In addition, different controllers or controller modules receive and transmit data with each other to make decisions and perform actions such that decentralized information processing takes place across the controllers 108.

In some embodiments, the mowing deck 100 may be configured to hinge or actuate into different positions for storage, such as flipping up to reduce the footprint of the ZTR 100 when in storage. In other embodiments, the mowing deck 100 may be configured to be installed and removed via a slide-on/off mechanism. The slide-on/off mechanism may be configured to allow the ZTR 100 to drive onto or off of the mowing deck 122 to install or remove the mowing deck 122. One or more latching devices may be located on the ZTR 100 and the mowing deck 122 to allow for the mating of the mowing deck 122 to the ZTR 100. This can allow for other attachments to be easily installed or removed onto the ZTR 100 as well. In further embodiments, the mowing deck 122 may further be configured to allow for blades to be front loaded into the mowing deck 122. This can allow for cutting blades to be installed without requiring the user to install new blades from below the mowing deck 122.

The mowing deck 122 may further include one or more inserts to reduce sound emissions. The inserts may be made of various materials to deaden the sounds produced by the attachments on the mowing deck 122, including the attachment motors 118. For example, the inserts may be made of various types of foam, rubber, Styrofoam, gels, etc. The mowing deck may further have one or more attachment rails to allow for other attachments to easily be added to the ZTR 100. In some embodiments, the attachment rail may be configured to include power and/or data connections, which may provide power to the additional attachments and/or communications to components on the ZTR 100, such as the controller 108. Example attachments may include blowers, vacuums, baggers, and the like.

In further embodiments, the mowing deck 122 may also have additional attachment motors 118 for controlling other aspects of the mowing deck 122, such as the storage mode actuators, mowing deck 122 height adjustment devices, multi-directional discharge chute controls, etc. In some embodiments, the ZTR 100 may also have various attachment motors 118, such as seat adjustment motors, suspension control motors, etc.

Returning now to the main body of the ZTR 100, the ZTR may include other features such as cup holders 124, adjustable seat 126, etc. In some embodiments, the cup holders 124 may be powered via the batteries 104 and contain heating and/or cooling elements to allow for items placed in the cup holders 124 to be heated or cooled, respectively. In some embodiments, the adjustable seat 126 may be coupled to the batteries 104 and configured to be adjusted via one or more electronic positioning devices. In still further embodiments, the adjustable seats may include one or more heating or cooling elements, powered by the batteries 104, to provide for operator comfort.

In one embodiment, the battery 104 is one or more removable battery packs. In some embodiments, the battery 104 may be a rechargeable battery, such as a Li-ion battery. However, other battery types, such as NiCd, lead-acid, Nickel-Metal Hydride (NiMH), or Lithium Polymer, are also contemplated. As described above, the battery 104 may be a lithium-ion battery comprising multiple Li-ion cells arranged in a variety of series (S) and parallel (P) configurations. In one configuration, the battery 104 includes seventy-eight cells. Each cell is rated at 3.6 volts and 2.5 amp-hours. The battery 104, in one configuration, arranges the cells in a 13S6P configuration with 13 cells connected in series in a group and six groups of cells connected in parallel. The series configuration yields a system voltage of 46.8 volts for the battery 104. The six parallel cell configuration yields fifteen amp-hours capacity for the battery 104. The combination of the two provides 702 watt-hours energy capacity for the battery 104.

In some embodiments, the battery 104 has the cells arranged in multiple layers. For a 13S6P configuration battery 104, each layer includes cells arranged in six groups and the battery 104 includes two layers of cells.

In an alternative embodiment, the cells are arranged in a single layer with six groups of thirteen cells each. In an application using four of the 13S6P configuration batteries 104, the total energy capacity would be 2808 watt-hours (2.8 kilowatt-hours). In this embodiment the battery 104 weighs about 10.75 pounds and is substantially shaped like a cube.

In another configuration, the battery 104 includes eighty-four cells arranged in a 14S6P configuration. Using cells rated at 3.6 volts and 2.5 amp-hours, this configuration yields a voltage of 50.4 volts, 15 amp-hours of capacity and 756 watt-hours of energy capacity. In other embodiments using cells rated at 3.9 volts and 2.5 amp-hours, the 13S6P arrangement would yield a voltage of 50.7 volts, 15 amp-hours of capacity, and 760.5 watt-hours of energy. In the 14S6P configuration, the voltage would be 54.6 volts, 15 amp-hours of capacity, and 819 watt-hours of energy.

In another configuration, the battery 104 includes one hundred cells arranged in a 20S5P configuration having five groups of twenty cells each. Each group or row of twenty cells is welded or otherwise connected together in series (e.g., by conductors 116), and each of the five groups of twenty cells is welded or connected together in parallel (e.g., by conductors). The cells used in the battery 104 may be 18650 form factor cylindrical cells (18 millimeter diameter and 65 millimeter length). In other configurations, the cells used in the battery 104 may be 21700 form factor cylindrical cells. These cells may be available in 3.2 amp hours, 2.9 amp-hours, 2.5 amp-hours, and other cell ratings. Using cells rated at 3.6 volts, and 3.2 amp-hours, a 20S5P configuration battery 104 provides a voltage of 72 volts, 16 amp hours of capacity, and 1152 watt-hours of energy. Using cells rated at 3.6 volts, and 2.9 amp hours, a 20S5P configuration battery module provides a voltage of 72 volts, 14.5 amp-hours of capacity, and 1044 watt-hours of energy. Using cells rated at 3.6 volts and 2.5 amp-hours, a 20S5P configuration battery pack provides a voltage of 72 volts, 12.5 amp-hours of capacity, and 900 watt-hours of energy.

In some embodiments, the battery 104 provides about one kilowatt-hour of energy (e.g., between 800 watt-hours and 1.2 kilowatt-hours) and weighs less than twenty pounds. Because the battery 104 may need to be changed in the field, the battery 104 needs to be of a manageable size and weight for the end user to lift, carry, install, remove, etc. so that the battery 104 is configured to provide manual portability by the user. The battery 104 is configured to be small enough, light enough, and graspable enough to allow the battery 104 to be manually portable by the user. The user does not need a lift, cart, or other carrying device to move the battery 104. Also, end products powered by the battery 104 generally scale in increments that can be measured in kilowatt-hours of energy. For example, a standard residential lawn tractor may require between two and three kilowatt-hours of energy capacity and a premium residential lawn tractor may require between three and four kilowatt-hours of energy capacity. Batteries 104 that provide about one kilowatt-hour of energy and weigh less than twenty pounds allow the end user to easily choose between a standard configuration and premium configuration of the lawn tractor or other end product by providing a reasonable number of battery modules to achieve either configuration and battery modules of a size and weight that can be easily manipulated as needed by the end user. The battery 104 may be interchangeable between different pieces of equipment (e.g., between a lawn tractor, a vehicle, a backup power supply, a stand-alone power supply, a portable generator, and a trolling motor).

Figure 2:
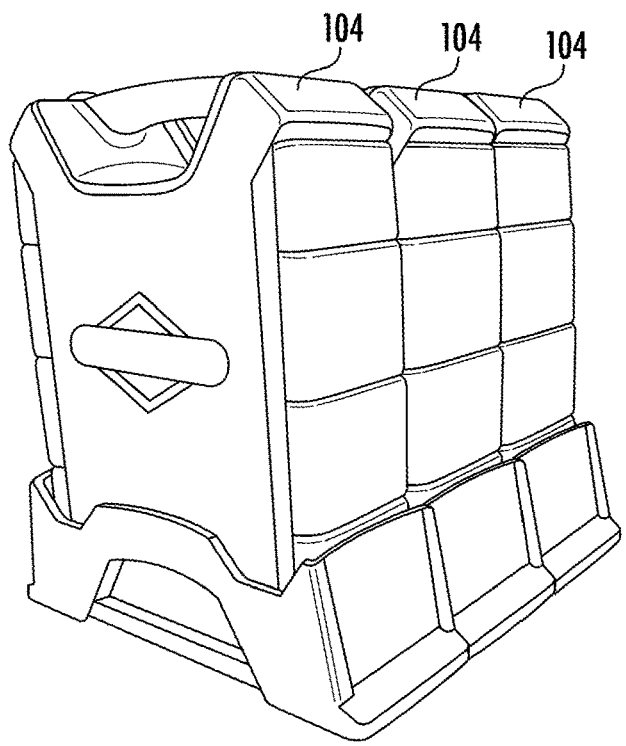
FIG. 2 is a perspective view of a first battery pack according to some embodiments.

The batteries 104 shown in FIG. 2 have a weight of approximately 13-15 pounds. In the embodiment illustrated, the batteries are each 1 kW battery packs. However, it is contemplated that different sized batteries could be utilized while operating within the scope of the present disclosure. In the embodiment shown in FIG. 2, each of the batteries 104 has the same physical size and electrical capacity. However, it is also contemplated that different types of battery packs, such as the physically smaller batteries, could be utilized in place of the batteries 104 or along with one or more of the batteries 104.

Figure 3:
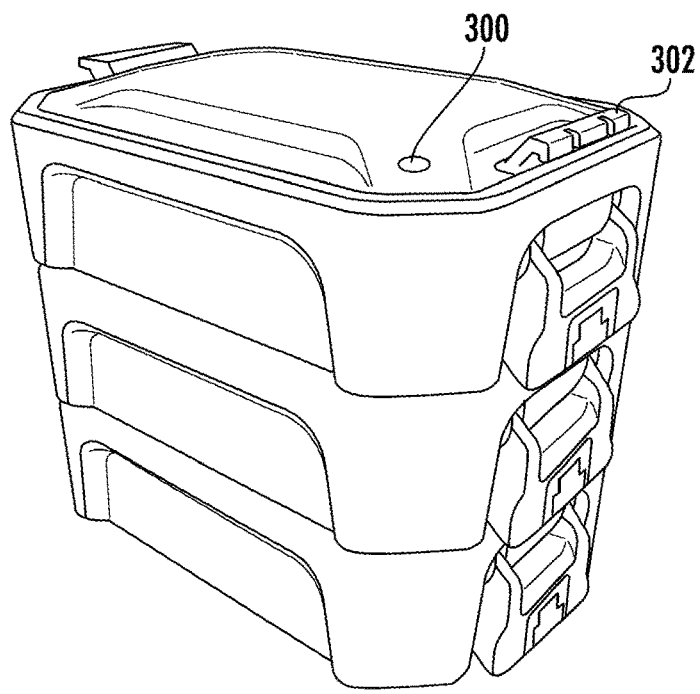
FIG. 3 is a perspective view of a second battery pack according to some embodiments.

The batteries 104 of FIG. 3 include outer casings 300 having a locking handle 302 that allows the individual battery packs to be locked together to form a stack as shown in FIG. 3. The locking handles may further be used to secure the battery 104 in a receptacle on the ZTR 100. Thus, a user may be able to remove the battery 104 from the ZTR 100 without a tool by actuating the locking handle on the battery 104. The batteries 104 shown in FIG. 3 may be configured as described above.

Returning now to FIG. 1, the sensors 102 on the ZTR 100 may be positioned around the ZTR 100 as shown, as well as in other locations as needed for a given configuration. The sensors 102 may be all of the same type, or may be a combination of different sensor types. Sensors may include object detection sensors, such as infrared (IR), LIDAR, RADAR, Time-of-Flight (ToF), CCD, CMOS, Ultrasonic, Sonar, or other sensors configured to detect objects. The visual sensors may be used to detect objects to map a lawn, or to assist in guidance of the ZTR 100. Further sensors may include moisture sensors, rain sensors, air quality sensors, magnetic field sensors (e.g. compass), temperature sensors, digital imaging sensors, motion detection sensors, rotation sensors, gyroscopes, chemical detection sensors, and the like. In some embodiments, the sensors 102 are coupled to the controller 108. The sensors 102 may further include weed sensing sensors, which can provide a count of weeds that are detected on a given lawn.

The antenna 106 may be configured to communicate with one or more other devices. In some embodiments, the antenna 106 is configured to communicate using a wireless communication protocol, including but not limited to, Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoWPAN, Thread, RFID, and other applicable wireless protocols. In some embodiments, the antenna 106 may communicate with a homeowner's network (e.g. via Wi-Fi). In some embodiments, the antenna 106 may communicate with the homeowner's network to access a central server, such as a cloud based server, as will be described in more detail. In other embodiments, the antenna 106 may communicate with a local communications hub or bridge, such as a communications hub associated with a service vehicle. In still other embodiments, the antenna 106 may be configured to allow for the ZTR 100 to communicate directly with a central or cloud-based server (e.g. via a cellular connection). In some embodiments, the antenna 106 may be used to communicate with a user device capable of remotely controlling the ZTR 100. Example user devices capable of remotely controlling the ZTR 100 may include dedicated remote controls, smart phones, tablet computers, laptop computers, or any other user device capable of interfacing with the antenna 106.

The antenna 106 may be configured to interface with one or more locating devices to provide location data to the controller 108 of the ZTR 100. In some embodiments, the antenna 106 may include a Global Positioning Satellite (GPS) antenna for receiving locations data from a number of GPS satellites. In other embodiments, the antenna 106 may be configured to receive one or more differential GPS signals for determining a location of the ZTR 100. In still other embodiments, the antenna 106 may be configured to receive one or more inputs from a local positioning system. For example, the antenna 106 may be configured to receive data from an installed boundary system (such as a buried cable, or placed transmitters). Additional local positioning data may come from an aerial transmitter, such as on a roof top or a drone. Further local positioning data may include optical boundary data, magnetic boundary data, etc. In still further embodiments, the antenna 106 may relay data to other ZTRs, or supervisory controllers to allow for a position of the ZTR 100 to be monitored.

Figure 4:
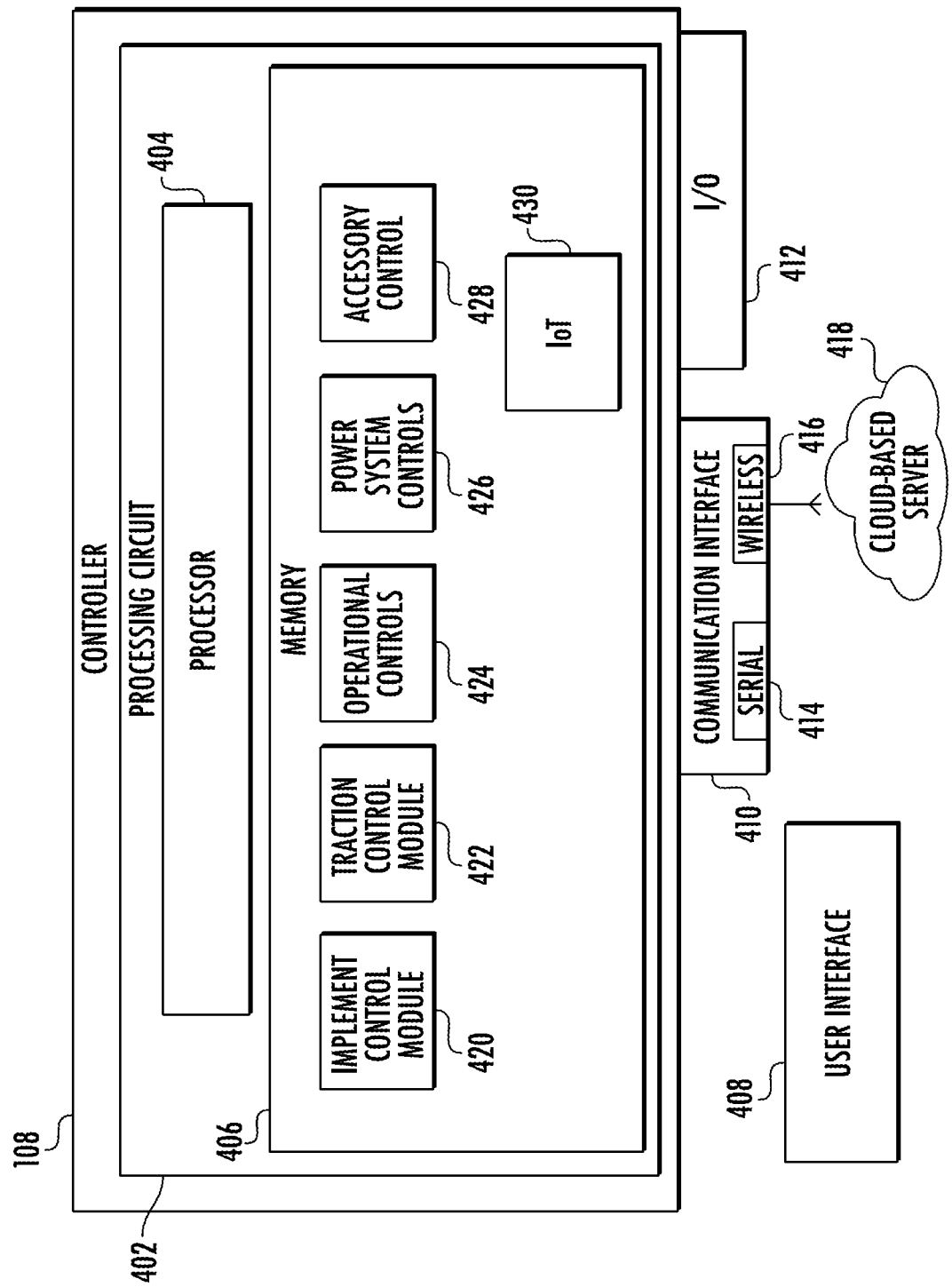
FIG. 4 is an electrical schematic illustration of a controller of the electric outdoor power equipment according to some embodiments.

Turning now to FIG. 4, a block diagram illustrating the controller 108 associated with the ZTR 100 is shown, according to some embodiments. In some configurations, the ZTR 100 may include a single controller 108. However, in other embodiments, the ZTR 100 may include more than one controller 108. In some embodiments, multiple controllers 108 may operate independently to perform one or more functions, as will be described below. In other embodiments, the multiple controllers 108 may be configured to function in parallel with each other. The controller 108 may include a processing circuit 402. The processing circuit 402 may include a processor 404 and a memory 406. The processor 404 may be general purpose or specific purpose processor, an application specific integrated circuit (ASIC), one or more field programmable gate arrays (FPGAs), a group of processing components (e.g. parallel processing units), a neural network processing system, or other applicable processing circuits. The processor 404 may be configured to execute computer code or instructions stored in the memory 406 or received from other computer readable media, such as physical media (e.g. CD-ROM, DVD-Rom, flash drive, etc.), network drives, remote servers, mobile devices, etc. The memory 406 may include one or more devices (e.g. memory units, memory devices, storage devices, etc.) for storing data and/or computer code for completing and/or facilitating the functions and processes described in the present disclosure. The memory 406 may include random access memory (RAM), read-only memory (ROM) hard drive storage (physical or solid state), temporary storage, non-volatile memory, flash memory, optical memory, or any other suitable memory component for storing software objects and/or computer instructions. The memory 406 may include database components, object code components, script components, or any other type of information structure for supporting the various functions and information structures described in the present disclosure. The memory 406 may be communicably connected to the processor via the processing circuit and may include computer code for executing (e.g. by the processor) one or more processes described herein.

The controller 108 may further be in communication with a user interface 408 associated with the ZTR 100, such as user interface 110. The controller 400 may further include a communication interface 410 and an I/O interface 412. The communication interface 410 may include a serial interface 414 and a wireless interface 416. The wireless interface 416 may be in communication with the antenna 106.

In one embodiment, the wireless communication interface 416 may be integrated into the controller 108 or as a separate communication module. In some embodiments, the wireless communication module 416 may be configured to communicate using one or more wireless protocols. For example, the wireless communication interface 416 may utilize wireless protocols including Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoWPAN, Thread, RFID, and other applicable wireless protocols. In some embodiments, the wireless communication interface 416 may be in communication with a cloud-based server 418. The cloud-based server 418 may be configured to interface with multiple programs and interfaces, and be accessible via the world wide web (e.g. the Internet). This can allow a user to access the controller 108 (and therefore the ZTR 100) via any device that has access to the World Wide Web. For example, a user may be able to access the controller 108 via a mobile device such as an internet connected computer, a smartphone (e.g. iPhone, Android phone, Windows phone), a tablet computer (e.g. iPad, Android Table, Microsoft Surface, etc.), or any other internet connected device. In some embodiments, the cloud-based server 418 may provide one or more web-based applications for interfacing between a user device and the controller 108, and thereby the associated outdoor power equipment. In other embodiments, the user's device may include a client-side application, which can interface with the controller 108 via the cloud-server 418. In still further embodiments, the user's device may include one or more client-side applications which can be configured to communicate directly to the controller 108 via the wireless communication interface 416, such as via Bluetooth, BLE, NFC, Zigbee, etc.

The serial communication interface 414 may utilize multiple serial communication protocols and/or hardware, including universal asynchronous receiver-transmitter (UART) communication, a serial peripheral interface bus (SPI), including MOSI, MISO, SCK, CS, and I2C, serial data lines (SDA), serial clock lines (SCL), universal serial bus (USB), RS-232, k-line, CAN, and the like. The I/O interface may be configured to provide communication between the controller 108 to one or systems, subsystems or components on the ZTR 100. For example, the I/O module 412 may interface with one or more of the sensors 102, the battery 104, one or more electric motors on the ZTR 100 (e.g. traction motors 114, hub motors 116, and/or attachment motors 118), or any other applicable systems. The I/O may be digital, analog, or a combination thereof.

As described above, the memory 406 may include one or more modules, scripts or programs for the processor 404 to execute. In some configurations, the memory 406 may include an implement control module 420, a traction control module 422, an operational controls module 424, a power system controls module 426, an accessory control module 428, and an IoT module 430. Further, it is contemplated that additional modules may be installed on or in the memory 406 to configure the controller 108 to control and/or implement additional functions over time. For example, additional modules may be installed to control implements that are designed to attach to the ZTR 100. Further, while the following functions are described as being performed by a discrete module, it is contemplated that one or more modules may be involved in performing certain functions. Further, in some configurations, some modules may be configured to perform the functions associated with one of the other modules described below. The control modules receive inputs from various sensors and control various components or motors of the ZTR 100 based on the inputs from the sensors. In general, the control modules described herein allow for a safer and more intuitive operation of the ZTR 100 for an operator.

Figure 5:
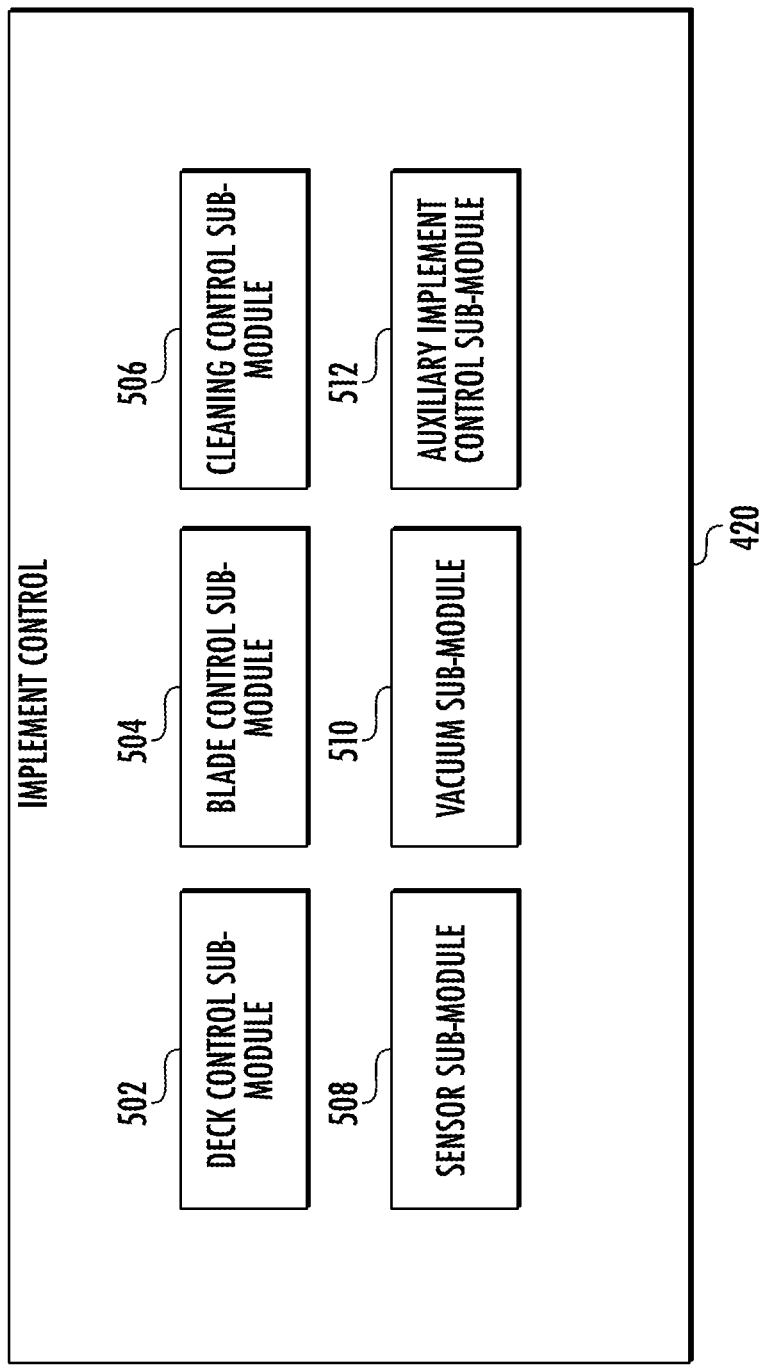
FIG. 5 is a schematic illustration of a traction control module, according to some embodiments.

The implement control module 420 may be configured to control one or more implements attached to the ZTR 100. Implements may include mowing decks, blowers, vacuums, and the like. Turning now to FIG. 5, a block diagram illustrating one or more functions associated with the implement control module 420 is shown, according to some embodiments. In some embodiments, the implement control module 420 may include one or more sub-modules, such as a deck control sub-module 502, a blade control sub-module 504, a cleaning control sub-module 506, an attachment sensor sub-module 508, a vacuum control sub-module, and an auxiliary implement control sub-module 512. In some examples, there may be more or fewer sub-modules, based on the application.

The deck control sub-module 502 may be configured to control one or more features on a deck attached to the ZTR 100, such as mower deck 122, as shown in FIG. 1. In some embodiments, the deck control sub-module 502 communicates with the one or more features on a deck via the I/O module. In some embodiments, the I/O module 412 may allow for data and/or power to be transmitted and/or received via the controller 108. In some embodiments, the controller 108 may communicate data and power to the attachment motors 118 via the I/O module 412. However, in some embodiments, the controller 108 may communicate with the attachment motors via the serial communication interface 414. The deck control-sub module 502 may be configured to operate a multi-directional discharge system on the deck. In some examples, the multi-directional discharge system may be configured to control one or more baffles and/or discharge chutes to allow for the grass clippings to be discharged from the deck in a direction desired by an operator of the ZTR 100. In some embodiments, the deck control sub-module 502 may coordinate with the blade control sub-module 504 to control a speed or direction of one or more of the blades on the deck to help direct the grass clippings as well. In some embodiments, the deck control sub-module 502 may interface with a convertible mowing deck to control whether the mowing deck is operating as a side discharge deck or a rear discharge deck.

The deck control sub-module 502 may further be configured to control one or more moisture blowers associated with the deck. The moisture blowers may be used to attempt to dry the lawn and/or clippings when the deck passes over. In some embodiments, high velocity air may be directed towards the lawn to attempt to reduce the moisture. In some embodiments, the moisture blower may be configured to blow heated air to the lawn, and the velocity and/or temperature of the air may be controlled via the deck control sub-module 502. In still further examples, the deck control sub-module 502 may be configured to control a direction of the moisture blower.

The blade control sub-module 504 may be configured to control the operation of one or more cutting blades and/or attachment motors 118 on a mowing deck, such as mowing deck 122. In some embodiments, the blade control sub-module 504 may be configured to control each of the one or more attachment motors individually. For example, the blade control sub-module 504 may output power to each attachment motor 118 via the I/O module 410. However, in other examples, the blade control sub-module 504 may be configured to communicate with other controllers on the deck and/or attachment motors 118. For example, some attachment motors 118 may have an individual controller, while in other examples, the deck may have a common controller for operating the one or more attachment motors 118. In some examples, the blade control sub-module may communicate with various controllers controlling the attachment motors 118 via the serial communication interface 414 and/or the wireless communication interface 416.

In some embodiments, the blade control sub-module 504 may be configured to control the direction and/or speed of each of the blades on the deck, via the associated attachment motors 118. In further embodiments, the blade control sub-module 504 may receive information from the attachment motors 118, via the I/O module 412 and/or the communication interface 410. That information may include data, such as load data of the attachment motors 118. This load data may be indicative of a load experienced by the blade (e.g. effort required to cut). This load data may then be processed by the blade control sub-module 504 to determine an optimum operation of the attachment motors 118 to maximize the cutting efficiency based on the cutting conditions. In further examples, the blade control sub-module 504 may evaluate the load data, and develop a mowing schedule to help reduce the load placed on the blades. For example, the blade control module 504 may evaluate the current cutting schedule, and correlate that data to the load data for each cutting. Based on the analysis, the blade control sub-module 504 may be able to provide a user with the proposed schedule of a frequency to cut the grass to reduce load. In some embodiments, the information may be provided to the user via the user interface 110 and/or be transmitted to a user device via the wireless communication interface 416.

In still further examples, the blade control sub-module 504 may be configured to provide smart cutting protection for the blades/mowing deck. For example, the blade control sub-module 504 may be configured to receive real time data from the attachment motors 118 indicative of what is being cut by the blades. For example, the attachment motors 118 may provide effort data (e.g. power consumption, load spikes, etc.) to the blade control sub-module 118, which may indicate the type of material that the blades are encountering. For example, a first reading may indicate grass, while an increased effort reading may indicate a harder material, such a rock, plant, etc. In still further embodiments, the blade control sub-module 504 may further receive information from other devices, such as the sensors 102. The sensors 102 may provide visual data, audio data, density data of the material being cut, and the like. Based on this data, the blade control sub-module may be configured to brake one or more of the attachment motors 118 when an undesired material is encountered by the blades. The blade control sub-module 504 may further be configured to provide blade and/or attachment motor 118 maintenance feedback to the user. For example, the blade control sub-module 504 may be configured to analyze various data points provided by the attachment motors 118, as well as the sensors 102 (e.g. moisture data, density data, etc.), as well as historical data to provide maintenance feedback to a user. In some embodiments, the maintenance feedback may be provided to the user via the user interface 110 and/or transmitted to a user device via the wireless communication interface 416.

The cleaning control sub-module 506 may be configured to control one or more cleaning operations of an implement attached to the ZTR 100, such as mowing deck 122. In some embodiments, the mowing deck 122 may have an attachment to allow a user to attach a water hose, such as a standard household water hose, to the mowing deck 122. The mowing deck 122 may further include a series of water distribution channels and nozzles to maneuver water received via the water hose to the underside of the deck to provide a cleaning function of the mowing deck 122. In some embodiments, a user may be able to put the ZTR 100 into a cleaning mode. For example, the user may put the ZTR 100 into the cleaning mode via the user interface 110 and/or a user device via the wireless communication interface 416. In other embodiments, the ZTR 100 and/or mowing deck 122 may include sensors to detect water in the water distribution channels and initiate the cleaning mode. In one embodiment, the cleaning mode sub-module 506 may be configured to rotate the blades in the mowing deck 122 via the attachment motors 118 to agitate the water and improve the cleaning functions. In other embodiments, the cleaning control sub-module 506 may communicate with one or more sensors associated with the ZTR 100 and/or mowing deck 122, such as sensors 102. The sensors 102 may provide data such as imaging data, chemical data, conductivity data, etc. Based on the data from the sensors 102, the cleaning control sub-module 506 may be configured to determine a state of cleanliness of the ZTR 100 and/or the mowing deck 122. In some examples, the cleaning control sub-module 506 may monitor the cleanliness to provide an indication to a user when it is time to clean the ZTR 100 and/or the mowing deck 122. In further examples, the cleaning control sub-module may be configured to operate in a cleaning mode until the cleanliness of the ZTR 100 and/or mowing deck 122 has reached a predetermined value based on the data received from the sensors 102.

The sensor control sub-module 508 may be configured to interface with one or more sensors associated with the mower deck 122 or other implement. The sensors may be various types of sensors that may provide data relevant to the implements being used. For example, where the implement is a mowing deck, the sensors may provide information related to object detection, particulate sensing, moisture data, boundary data, grass type data, etc. This data may be provided to one or more modules or sub-modules within the controller 108 for processing, as described herein. The vacuum control sub-module 510 may be configured to operate one more vacuums associated with an attachment deck, such as mower deck 122. For example, some mowing decks may include various vacuum devices to assist with bagging leaves, grass clippings, or other yard debris. The vacuum control sub-module 510 may be configured to control various aspects of the vacuum, such as vacuum speed, suction forces, direction, and the like. The auxiliary implement control sub-module 512 may be configured to interface with various other implements that are attached to the ZTR 100. Implements may include blowers, vacuums, thatchers, seeders, spreaders, brush cutters, power rakes, and the like. The auxiliary implement control sub-module 512 may be configured to allow the controller 108 to control and operate the auxiliary implements. For example, the auxiliary implement control sub-module 512 may be configured to interface with one or more auxiliary controllers associated with the auxiliary implements. In further examples, the auxiliary implement control sub-module 512 may be configured to control power provided from the batteries 104 to the one or more auxiliary implements.

Figure 6:
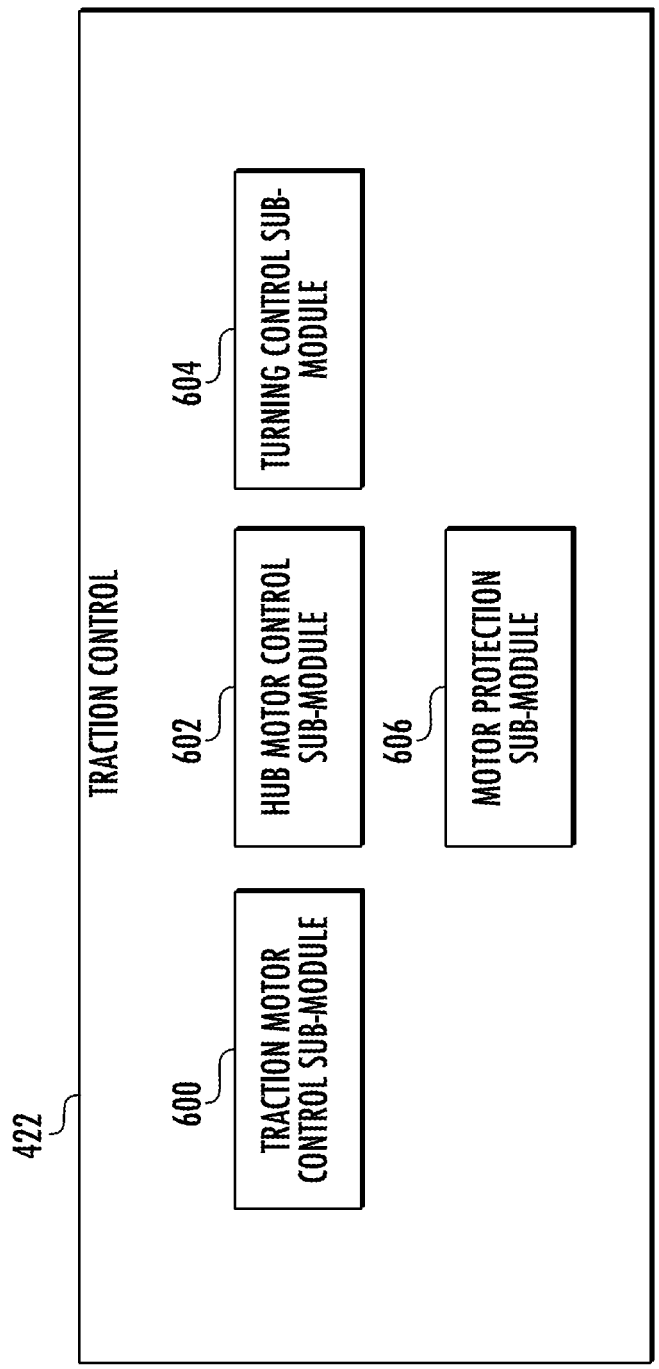
FIG. 6 is a schematic illustration of an implement control module, according to some embodiments.
Figure 7:
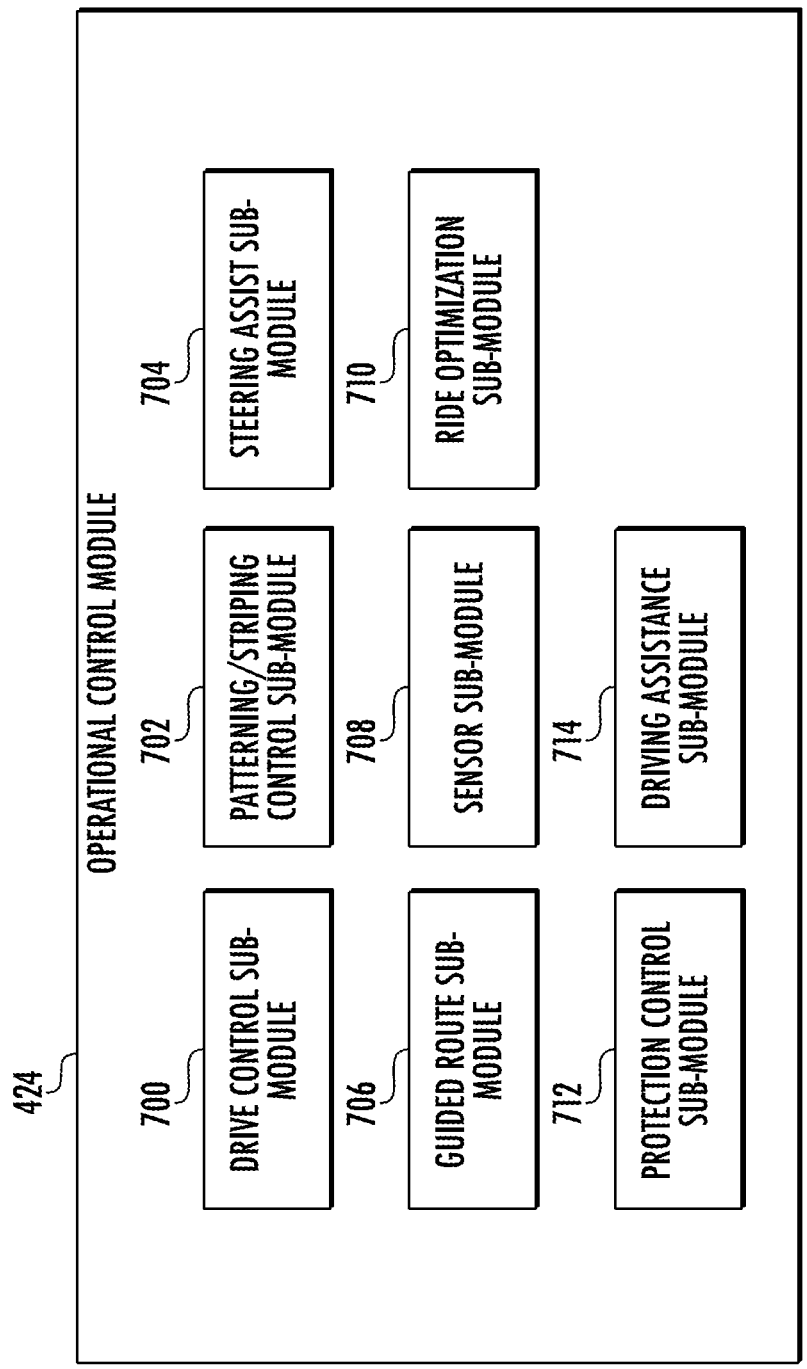
FIG. 7 is a schematic illustration of an operational control module, according to some embodiments.
Figure 8:
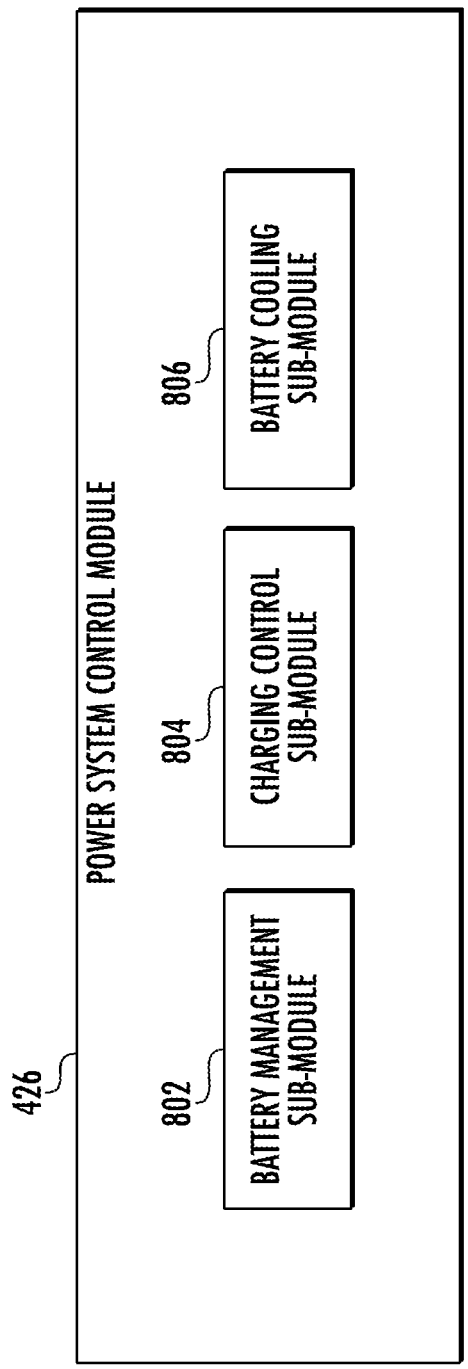
FIG. 8 is a schematic illustration of a power system control module, according to some embodiments.

The traction control module 422 may be configured to control one or more traction motors associated with the ZTR 100. Traction motors may include rear traction motors 124, as shown in FIG. 1. However, other devices may have additional traction motors, as required. Further, the traction control module 422 may be configured to control other electric motors on the ZTR 100, such as hub motors 116. Turning now to FIG. 6, a block diagram illustrating one or more functions associated with the traction control module 422 is shown, according to some embodiments. In some embodiments, the traction control module 422 may include one or more sub-modules, such as a traction motor control sub-module 600, a hub motor control sub-module 602, a turning control sub-module 604, and a motor protection sub-module 606.

The traction motor control sub-module 600 may be configured to control one or more traction motors associated with the ZTR 100, such as rear traction motors 124. In one example, the traction motor control sub-module 600 may communicate with the traction motors (e.g. provide power and data) via the I/O module 412. In other examples, the traction motor control sub-module 600 may communicate with one or more controllers associated with the one or more traction controllers via the I/O module 412 and/or the serial communication interface 414. In some embodiments, the traction motor control sub-module 600 may be configured to control various aspects of the traction motors, such as direction, torque, power, speed, and the like. Where the traction motor control sub-module 600 directly controls the power being applied to the traction motors via the I/O 412, the traction motor control sub-module can directly provide the required power, to the applicable connections of the traction motors (e.g. directional control), directly from the batteries 104 to the traction motors. Where the traction motor control sub-module 600 communicates with one or more traction motor controllers via the I/O 412 and or the serial communication interface 414, the traction motor control sub-module 600 can be configured to provide instructions to the relevant traction motor controller to allow the relevant traction motor controller to direct power from the batteries 104, as required to drive the one or more traction motors as intended. In some embodiments, the traction motor control module 600 is configured to control the traction motors based on one or more inputs received from the one or more input device 112. As stated above, the input devices may include drive handles, steering wheels, joysticks, etc. The input devices 112 may provide an instruction to the traction motor control sub-module indicating a requested direction, speed, etc. desired by the user of the ZTR 100. The traction motor control module 600 may be configured to process these inputs and drive the associated traction motors accordingly to provide the requested operation.

The hub motor control sub-module 602 may be configured to control one or more hub motors, such as hub motors 116 associated with the ZTR 100. Hub motors may be associated with one or more non-traction wheels (e.g. non-drive wheels, such as castors) associated with the ZTR 100, or other outdoor power equipment. The hub motors may be configured to move the non-traction wheels in certain rotational directions, and may further be configured to lock or maintain a rotational position of the non-traction wheel. In still other examples, the hub motors may be configured to place a friction on the non-traction wheels to assist in braking and/or maneuvering of the ZTR 100. In further examples, the hub motors may be configured to change an elevation or extension of the non-traction wheels. The hub motor control sub-module 602 may be configured to interface with one or more hub motors on the ZTR 100. In some embodiments, the hub motor control sub-module 602 may be configured to directly provide data and/or power to the hub motors via the I/O module 412. However, in other examples, the hub motor control sub-module 602 may be configured to provide data and power to the hub motors via the serial communication interface 414 and the I/O module 412. In still further examples, one or more hub controllers associated with the hub motors may be capable of controlling the power provided to the motor, as well as the ability to control speed, torque, etc. In embodiments where the hub motors are controlled by a separate hub controller, the hub motor control sub-module 602 may be configured to provide data to the hub motors via the communication interface 410.

The hub motor control sub-module may be configured to provide data and/or power to the hub motors to perform certain operations. As stated above, the hub motor control sub-module may be configured to rotate, lock, or elevate one or more non-traction wheels associated with the ZTR 100. In some embodiments, the hub motor control sub-module 602 may be configured to operate the hub motors based on one or more inputs received from a user, such as when initiating a turn, or attempting to raise or lower an attachment, such as mowing deck 122. In some embodiments, the hub motor control sub-module 602 may be configured to disengage the hub motors from the non-traction wheels to allow for the non-traction wheels to move freely during operation of the ZTR 100. The hub motor control sub-module 602 may further be configured to reengage the hub motors when control of the non-traction wheels is needed. In some configurations, the hub motor control sub-module 602 may be configured to allow the ZTR 100 to operate in a hill steer mode. The hill steer mode may be activated by a user, or may be automatically initiated when it is determined that the ZTR 100 is operating along a hill. The hub motor control sub-module 602 may be configured to control the direction of the non-traction wheels when operating in hill steer mode to ensure that the ZTR 100 maintains its desired direction when operating along the side of a hill. This can be used to prevent the front portion of the ZTR 100 (or any other non-traction portion of other outdoor equipment) from attempting to go downhill when the ZTR 100 is being operated to drive laterally along the side of a hill. In further configurations, the hub motor control sub-module 602 is configured to interface with other modules and sub-modules to effectuate the operations associated with other said modules and sub-modules, as described below.

The turning control sub-module 604 may be configured to interface with one or more of the other modules or sub-modules associated with the controller 108, such as the traction motor control sub-module 600, and/or the hub motor control sub-module 602, described above. The turning control sub-module 604 may be configured to instruct the other modules and/or sub-modules to perform certain turning functions. In some embodiments, the turning control sub-module 604 may receive one or more inputs indicating that the user wishes to initiate a turn, such as via input devices 112. When doing normal turning functions, the turning control sub-module 604 may instruct the traction motor control sub-module 600 to provide more or less power to one of the traction motors 124 to turn the ZTR 100. The turning control sub-module 604 may also instruct the hub motor control sub-module 602 to position the one or more non-drive wheels via the hub motors 116.

The turning control sub-module 604 may further be configured to instruct the ZTR 100 to perform certain automatic turn functions. In one embodiments, the ZTR 100 may be configured to execute a push button zero turn function. For example, a user may select an automatic (i.e. push button) zero turn function via one or more inputs which may be received by the turning control sub-module 604 (e.g. via I/O module 412 and/or communication interface 410). Upon receiving the automatic zero turn request, the turning control sub-module 604 may provide instruction to the traction motor control sub-module and/or hub motor control sub-module 602, which may then execute a zero radius turn. The turning control sub-module 604 may further be configured to execute an automatic Y-turn (e.g. where the ZTR 100 reverses in a first direction to proceed in a forward direction at an angle to an original forward direction). Upon receiving an input that the user would like to initiate a y-turn, the turning control sub-module 604 would communicate instructions to the traction motor control sub-module 600 and/or the hub motor control sub-module 602 to initiate the turn. In some embodiments, the turning control sub-module 604 may be in communication with one or more sensors 102 to monitor for object around the ZTR 100, and control the Y-turn to avoid collisions between the ZTR 100 and the detected objects. In further examples, the turning control sub-module 604 may be configured to interface with a power steering component (such as a steering wheel with electronic controls, or user inputs 112) associated with the ZTR 100. The power steering component may provide an electronic signal to the turning control sub-module 604, which can be translated into signals that can be provided to the traction motor control sub-module 600 and/or the hub motor control sub-module 602 to effectuate the required steering functions requested by the user.

The motor protection sub-module 606 may be configured to monitor and protect one or more electric motors associated with the ZTR 100, such as traction motors 124, hub motors 116 and/or attachment motors 118. In some embodiments, the motor protection sub-module 606 may receive data from the one or more electric motors, such as current draw, motor temperature, voltage, speed, measured impedance, etc. Based on the received data, the motor protection sub-module 606 may be able to determine a state of health (SoH) of the one or more electric motors. Based on the SoH of the motor, the motor protection sub-module 606 may provide the SoH, as well as other data such as temperature, to the user, such as via a user device and/or the user interface 110. In some embodiments the motor protection sub-module 606 may provide the SoH to the user device via the communication interface 410. In further embodiments, the motor protection sub-module 606 may provide the SoH to the cloud-based server 418 for analysis. One or more programs within the cloud-based server 416 may be configured to provide one or more maintenance suggestions to the user based on the monitored SoH. In further embodiments, the motor protection sub-module 606 may provide the motor data to the cloud-based server 418, via the wireless communication interface 416, and the cloud-based server 418 may then be configured to determine the SoH of the one or more motors. This can further allow for remote monitoring of data associated with the one or more electric motors, such as temperature, etc.

The operational control module 424 may be configured to control one or more operations associated with the ZTR 100. The operational control module 424 may include various sub-modules, such as a drive control sub-module 700, a patterning/striping control sub-module 702, a steering assist sub-module 704, a guided route sub-module 706, a sensor module 708, a ride optimization module 710, a safety module 712, and/or a driving assistance sub-module 714. The sub-modules may be configured to interface with one or more other modules as described herein, such as the traction module 422 and/or the implement module 420.

The drive control sub-module 700 may be configured to perform one or more functions associated with driving the ZTR 100. As described above, the drive control module 700 may be in communication with one or more other modules or sub-modules to effectuate the driving functions described below. In one embodiments, the drive control module 700 may be configured to allow the ZTR 100 to enter a pause mode when a user selects the pause mode. In some embodiments, the user may select the pause mode via the user interface 110 and/or the input devices 112. The pause mode may stop operation of the ZTR 100 temporarily, while still maintaining the previous operational settings (e.g. cutting modes, cutting heights, or other functions described herein). The user may then de-select the pause function, and the ZTR 100 will return to the previous operational mode.

The drive control sub-module 700 may further be configured to perform a collision control function. The collision control function may be an automatic function executed by the drive control sub-module 700 which access various sensors, such as sensors 102, to prevent collisions between the ZTR 100 and other objects. In some embodiments, the drive control sub-module 700 may provide instructions to the traction control sub-module 600, the hub motor control sub-module 602 and/or the turning control sub-module 604 to perform certain operations to avoid the potential collision. In some examples, the drive control sub-module 700 may instruct the above sub-modules to stop the ZTR 100, such as via electronic braking of the traction motors to prevent a potential collision. In other examples, the drive control sub-module 700 may send instructions to the above sub-modules to initiate a turn and/or reduction in speed to avoid the potential collision. The collision control function may access sensor data, such as optical data, RADAR data, LIDAR data, proximity sensor data, and the like. The collision control function may constantly monitor the surroundings near the ZTR 100 to determine the best method for collision avoidance when needed. In some embodiments, the collision control function may further map possible object or obstacles that are constantly encountered and store their location for future reference. For example, the collision control function may store the location (e.g. GPS location) of all encountered objects, and provide pre-emptive avoidance of the objects.

The drive control sub-module 700 may further be configured to provide a weight based operation mode. The weight based operation mode may be configured to modify the various driving parameters based on the weight of the user. For example, for a lighter weight user the weight based operation mode may restrict the operating speed and/or turning speed to prevent the user from being overly stressed or moved about on the ZTR 100. Alternatively, for a lighter weight user the weight based operation mode may allow for some higher speed operation based on an ability to brake the ZTR 100.

The drive control sub-module 700 may also be configured to provide a brake control function of the ZTR 100. The brake control function may be configured to control different braking mechanisms on the ZTR 100. In some embodiments, the brake control function may communicate with the traction control module 600 to provide electronic braking of the traction motors 124. In some embodiments, the ZTR 100 may be configured to allow for regenerative braking, wherein braking energy is stored in an energy storage device such as the batteries 104, and/or other storage devices, such as super capacitors. In some embodiments, the brake control function may instruction the traction motor control sub-module 600 to transfer power from the traction motors to a power dissipation system, such as a resistor bank. In further examples, the brake control function may be configured to operate one or more physical brakes (e.g. drum brakes, pad brakes, etc.) associated with the traction wheels and/or non-traction wheels associated with the ZTR 100. In still further embodiments, the brake control function may communicate with the turning control sub-module 604 to assist in executing turns by applying a braking force to one or more wheels on the ZTR 100. The braking control function may also be configured to operate other braking functions of the ZTR 100, as needed.

The drive control sub-module 700 may further be configured to allow the ZTR 100 to be operated in a one-handed operational mode. The one-handed operational mode may allow for a user to operate the ZTR 100 with a single hand, such as via a single input device 112. In some embodiments, the user may use a single joystick to control direction, speed and attachments, which may be processed by the one-handed operational mode. This can allow for fully electronic, or "drive-by-wire" operation of the ZTR 100.

The drive control sub-module 700 may further be configured to operate the ZTR 100 in a cart mode. The cart mode may allow for higher speeds to allow the ZTR 100 to be operated as a cart. In some embodiments, the cart mode may provide for additional torque or traction to be provided to the traction motors where the ZTR 100 is being used to transport items or objects.

The operational control module 424 may further include a patterning/striping control sub-module 702. The patterning/striping control sub-module 702 may be configured to allow a user to instruct the ZTR 100 to stripe or pattern a lawn. In some embodiments, the patterning/striping control sub-module 702 to perform an automatic striping function. The automatic striping function may allow a user to input a desired striping pattern of the lawn. In some embodiments, the user may input the striping patter via the user interface 110. In other embodiments, the user may be able to input the striping pattern into a user device, which can be communicated to the controller 108 via the wireless communication interface 416. In still further embodiments, the user may access one or more programs via the cloud-based server 418, which can be communicated to the controller via the wireless communication interface 416. In some embodiments, the automatic striping function may access GPS data to aid in the automatic patterning function 100. For example, the user may be able to manually map a lawn based on GPS data as well as other data, such as from sensors 102. The user may be able to view the map via the user interface and/or a user device. In other embodiments, the user may be able to access a layout of the lawn via the cloud-based server 418 and/or via a user device. The user may then select a predefined pattern, or manually lay out a pattern onto the layout, which may then be uploaded to the controller 108 via the wireless communication interface 416.

The patterning/striping control module 702 may then be configured to provide instructions to the traction control module 422 and/or the implement control module 420 to effectuate the desired patterning or striping on the lawn. For example, the automatic striping functions may instruct the user and/or the ZTR 100 when to turn to achieve the striping. Further, the automatic striping function may provide instructions to the implement control module 420 to control the mowing deck 122 (e.g. height), blade speed, blade angle, etc. in order to obtain the desired pattern and/or striping requested by the user. In still further embodiments, the pattern may be stored in the memory 406 for later access by the user. In some embodiments, a user may pattern the lawn a first time, and the track of the ZTR 100 may be measured via a GPS sensor on the ZTR 100. The track may be stored in the memory 406, and later used to automatically re-pattern the lawn.

The operational control module 424 may further include a steering assist sub-module 704. The steering assist sub-module 704 may allow for power steering functions to be executed, such as described above. In other examples, the steering assist sub-module 704 may provide a straight line control function. The straight line control function may use various sensor data, as well as operational data such as traction motor speeds, motor slips, motor torques, and/or GPS data to determine if the ZTR 100 is running in a straight line, when desired. Based on the sensor data, the straight line control function may provide instructions to the traction motor control sub-module 600, and/or the hub motor control sub-module 602 to maintain a straight line by adjusting the speed of the individual traction motors 124 and/or by positioning the hub wheels via the hub motors 116. In some embodiments, the user may be able to activate the straight line function via a user input 112.

The operational control module 424 may further include a guided route sub-module 706. The guided route sub-module 706 may be configured to provide automated guidance to the ZTR 100. For example, the guided route sub-module 706 may allow for the ZTR 100 to automatically guide itself around to perform a task (e.g. mow a lawn) without additional input from the user. In some embodiments, the user may control the implements while the guided route sub-module 706 maneuvers the ZTR 100 around the work area. In some embodiments, the guided route sub-module 706 is configured to interface with one or more sensors, including proximity sensors, and or GPS sensors. In some embodiments, the guided route sub-module 706 may be in communication with the sensor sub-module 708, described below, which may provide data to the guided route sub-module.

The guided route sub-module 706 may utilize GPS data to perform the guided operations. In some embodiments, the guided route sub-module 706 may monitor the route taken by the ZTR 100 under user control via GPS data (as well as other data, such as proximity data) and operate in a learning mode. In some embodiments, the user may provide instructions to the guided route sub-module 706 that they are operating in the "learning mode" which indicates that the route being traveled by the ZTR 100 is one in which the user would like to automate. In some embodiments, the guided route sub-module may use data from multiple lawn cutting events to map out the route. Further, the guided route sub-module 706 may be configured to continue learning a route when controlling the ZTR 100 in the guided route mode. This continued learning allows the guided route sub-module to continue to refine the guide route. In some embodiments, the user may be able to provide input to the ZTR 100, such as via the user interface 110 and/or a user device, indicating satisfaction with the guided route (e.g. feedback). These inputs can further be used by the guided route sub-module 706 to improve the route.

The guided route sub-module 706 may further be configured to optimize one or more routes. Optimization of the route may include determine the most energy efficient route, the quickest route, etc. The guided route sub-module 706 may monitor a route and then determine slight changes which could optimize the route. In some embodiments, the guided route sub-module 706 may utilize a trial-and-error method to determine an optimized route. In some embodiments, the guide route sub-module 706 may provide route data to the cloud-based server, such as via wireless communication interface 416. The cloud-based server 418 may include one or more optimization routines which can be configured to analyze the provided data and optimize a given route.

The sensor sub module 708 may be configured to receive, process and/or parse data received from one or more sensors associated with the ZTR 100. The ZTR 100 sensors may include those listed above, such as object detection sensors, proximity sensors, air quality sensors, GPS sensors, moisture sensors, etc. In some examples, the sensor sub-module 708 is configured to provide the sensor data to the other modules and sub-modules described herein.

The operational control module 424 may further include a ride optimization sub-module 710. The ride optimization sub-module may be configured to optimize a ride for one or more users of the ZTR 100. For example, the ride optimization sub-module 710 may be configured to provide a user learning mode. The user learning mode may be configured to learn the preferences of a given user. In some embodiments, the ride optimization sub-module 710 may distinguish between multiple users using various processes, including equating a weight with a given user, use of a biometric sensor, a user id (e.g. user specific key, RFID, etc.) or via other factors. The user learning mode may monitor various parameters associated with the use of the ZTR 100 by a given user. The parameters may include seat positions, speed levels, turning speeds, noise levels, and/or the use of the functions described herein. The user learning mode may learn these preferences and automatically initiate one or more of the user preferences when a specific user is determined to be operating the ZTR 100. The user learning mode may further allow for a user to set the preferences for the user or for other users. For example, a user may set user preferences for when a younger user is operating the ZTR 100, such as by limiting a speed of the ZTR 100.

The ride optimization sub-module may further be configured to operate in a given mode to maximize available run time. For example, some features may be turned off based on the remaining run time in order to extend operating time of the ZTR 100. Further, if the user indicates that they want to maximize the available run-time, the ride optimization sub-module 710 may modify the available options and extra functions to do so. The ride optimization sub-module 710 may further be configured to enter a limp mode to allow the ZTR 100 to return to its home location (e.g. where the charger is). In some examples, the user may instruct the ZTR 100 to enter the limp mode when there is a predetermined amount of run time available in the batteries 104. In other embodiments, the ride optimization sub-module 710 may automatically initiate the limp mode based on various factors. For example, the ride optimization sub-module 710 may determine the distance and time it would take to return to the charging station based on GPS data, and automatically enter the limp mode to ensure that they ZTR 100 can return to the home location before the batteries are exhausted.

The ride optimization sub-module may further be configured to control an active suspension of the ZTR 100. In further examples, the ride optimization sub-module 710 may be configured to execute one or more gamification programs to make the user experience more enjoyable. Gamification programs may utilize augmented reality (AR), audio, or visual interfaces to provide the user with one or more games, or actions simulating games to improve the experience of using the ZTR 100.

The operational control module 424 may further be configured to include a protection control sub-module 712. The protection control sub-module 712 may be configured to execute one or more protection functions as described below. In some examples, the protection control sub-module 712 may execute a rollover protection function. The rollover protection function may be configured to increase and/or decrease power to one or more of the traction motors 124 when the ZTR 100 is in a possible rollover scenario. For example, one or more sensors, such as accelerometers, gyroscopes, and the like, may provide data to the controller 108 indicating a potential rollover conditions. The rollover protection function may then override commands being provided to the one or more traction motors 124 to reduce the risk of a rollover. The rollover protection function may further be configured to control other motors such as the hub motors 116, as well as features such as the mowing deck 122.

The protection control sub-module 712 may further be configured to execute a slide protection function. The slide protection function may help to prevent the ZTR 100 from sliding, such as when it is being operated on a hillside, or in slippery conditions. The slide protection function may aid in slip protection by engaging anti-lock brakes on the traction wheels 120. The slide protection function may be further configured to lock one or more of the hub wheels, such as via the hub motors 116 to further prevent sliding. In some embodiments, the slide protection function may be automatically engaged when one or more sensors indicate that the ZTR 100 is beginning to slip, or has the potential to begin slipping. The protection control sub-module 712 may further include a back-up protection function. The backup protection function may be configured to prevent operation of the ZTR 100 in a reverse direction when an object or obstacle is determined to be behind the ZTR 100. In some embodiments, sensors such as optical sensors, distance sensors (e.g. sonar, time-of-flight, infrared, etc.) may be used to determine whether an object or obstacle is behind the ZTR 100, and may further determine the distance. In some instances, the reverse protection function may allow for different operations to be performed based on a determined distance to the object or obstacle determined to be behind the ZTR 100. For example, if the distance to the object or obstacle is more than a first distance (e.g. 10 feet), the reverse protection function may limit the maximum reverse speed of the ZTR 100. In some embodiments, the reverse protection function may incrementally reduce the speed based on the determined distance. The reverse protection function may further be configured to stop or prevent the ZTR 100 from reversing further once the determined distance is below a predetermined distance (e.g. 5 feet).

The operational control module 424 may further include a driving assistance sub-module 714. The driving assistance sub-module 714 may be configured to execute various functions to improve the ability of the user to drive and control the ZTR 100. In one embodiment, the driving assistance sub-module 714 may include an automatic row repositioning mode. The automatic row repositioning mode may allow for each row of cut grass to be in parallel, to improve the aesthetic of the lawn. In some embodiments, the automatic row repositioning mode may use data from one or more sensors to position the ZTR 100 for each row. In some embodiments, the automatic row repositioning mode may utilize directional data, such as from a compass or GPS data. In other embodiments, the automatic row repositioning mode may utilize locational data, such as that provided via GPS. In other examples, the automatic row repositioning mode may utilize imaging data (e.g. via optical sensors) to line up the current row with the previously cut row.

The driving assistance module 714 may further be configured to control a differential lock of the ZTR 100. The driving assistance module 714 may further be configured to execute a straight line control function. The straight line control function may allow a user to indicate that a straight line is desired, and the straight line control function will control the traction motors 124 and/or the hub motors 116 to ensure that the ZTR 100 travels in a straight line until a turn is initiated by the user. In some embodiments, the straight line control function may utilize directional data, such as via a digital compass. In other embodiments, other sensors may provide the necessary data to the straight line control function to ensure the straight line can be maintained. The straight line control function may be configured to control the speed of the traction motors 124, as well as the position of the hub wheels, such as via the hub motors.

The driving assistance module 714 may further be configured to execute one or more stability functions, such as traction control, scuff control, and anti-skidding functions. When executing the stability functions, the driving assistance module 714 may control speed and directions of the traction motors 124 and the hub motors 116. The driving assistance module 714 may also be configured to execute a side hill control function. The side hill control function can be used to assist the driver in overcoming gravity attempting to push the ZTR 100 downhill when the user is cutting laterally along the side of a hill. In one embodiment, the side hill control function engages the hub motors to position the hub wheels in such a way as to counteract the gravitational force placed on the ZTR 100. In further embodiments, the driving assistance module 714 may execute a trim mode. The trim mode may be configured to control the speed and direction of the ZTR 100 when trimming to achieve a close trim without hitting one or more obstacles (e.g. sidewalks, vehicles, trees, bushes, houses, etc.). The trim mode may utilize data from one or more proximity sensors on the ZTR 100 and/or the mowing deck 122 or other attachment to control the ZTR 100 when in trim mode.

The power system control module may be configured to control one or more power systems of the ZTR 100, and may include various sub-modules, such as a battery management sub-module 802, a charging control sub-module 804, and a battery cooling sub-module 806. The battery management sub-module 802 may be configured to control one or more aspects of the batteries 104. In some embodiments, the battery management sub-module 802 may be configured to determine a state-of-charge (SoC) and/or state-of-health (SoH) of the batteries. The battery management sub-module may determine the SoC and/or SoH based on monitored parameters associated with the batteries 104, such as battery temperature, battery current, battery voltage, etc. In some embodiments, the battery management sub-module 802 may be in communication with one or more battery management systems (BMS) of the batteries. The SoH and/or SoC may be displayed to a user via the user interface 110 and/or a user device. In some embodiments, the battery management sub-module 802 may provide the SoH and SoC of the batteries 104 to the cloud-based server 418 via the wireless communication interface 410. The battery management sub-module 802 may further be configured to determine an estimated time before needed recharge, which can be displayed to the user via the user interface 110 and/or a user device. The battery management sub-module 802 may further operate the ZTR 100 in a boost mode. The boost mode may be configured to allow the batteries to discharge more current for a limited amount of time. In some embodiments, the boost mode may limit the amount of boost time based on available battery capacity and/or battery temperature.

The charging control sub-module 804 may be configured to control one or more functions related to the charging of the batteries 104. In one embodiment, the charging control sub-module 804 may be configured interact with one or more inductive charging systems associated with the ZTR 100. Inductive charging can allow for wireless charging of the batteries. In one example, an inductive charging receiver may be located on a portion of the ZTR 100, such as the undercarriage. The inductive charging receiver may be configured to interface with an inductive charging transmitter, which may be located near a power source. Once the ZTR 100 is positioned over the inductive charging transmitter, the inductive charging function may instruct the inductive charging receiver to transmit power to the batteries that it receives. Once the batteries 104 are fully charged, the inductive charging function may instruct the inductive charging receiver to stop transmitting power to the batteries 104. In some embodiments, the inductive charging function may provide instruction to the inductive power receiver to inform the inductive power transmitter that no more power is required.

The charging control sub-module 804 may further be configured to interface with one or more renewable power devices on the ZTR 100. The renewable power devices may include exhaust reclamation devices, solar panels, etc. The charging control sub-module 804 may be configured to allow for power to be transmitted from the renewable power devices to the batteries. Similarly, the charging control sub-module 804 may be configured to control power generated via a regeneration function (e.g. via regenerative braking). The charging control sub-module 804 may be configured to transfer power to batteries 104 that is regenerated. The charging control sub-module 804 may further be configured to monitor the ability of the batteries to accept the regenerative power, and may direct excess regenerative power to one or more discharge devices, such as a resistor bank. The charging control sub-module 804 may further be configured to interface with one or more standard utility connection based charging devices (e.g. plug in charging) to charge the batteries 104, which can allow for on-board charging of the batteries. In some embodiments, the charging control sub-module 804 may be configured to perform a quick charge of the batteries. The quick charge function may increase the current provided to the batteries 104 at a given time to allow for a quick recharge. In some embodiments, the quick recharge may have a limited effect on the overall charge of the batteries 104.

The battery cooling sub-module 806 may be configured to monitor and regulate the temperature of the batteries 104. In some embodiments, the battery cooling sub-module 806 may interface with one or more airflow devices, such as fans, to regulate the temperature of the batteries 104. In embodiments where the fans are electric fans, the battery cooling sub-module 806 may be configured to vary the air flow over the batteries to optimize the cooling of the batteries. In other embodiments, the battery cooling sub-module 806 may be configured to control a liquid cooling system for the batteries 104. The battery cooling sub-module 806 may monitor temperatures of both the coolant and the batteries 104, and control one or more cooling fans as needed to optimize cooling of the batteries. In some embodiments, the battery cooling sub-module 806 may be configured to reduce the power output of the batteries to reduce the temperatures of the batteries in order to avoid potential damage to the batteries 104.

Figure 9:
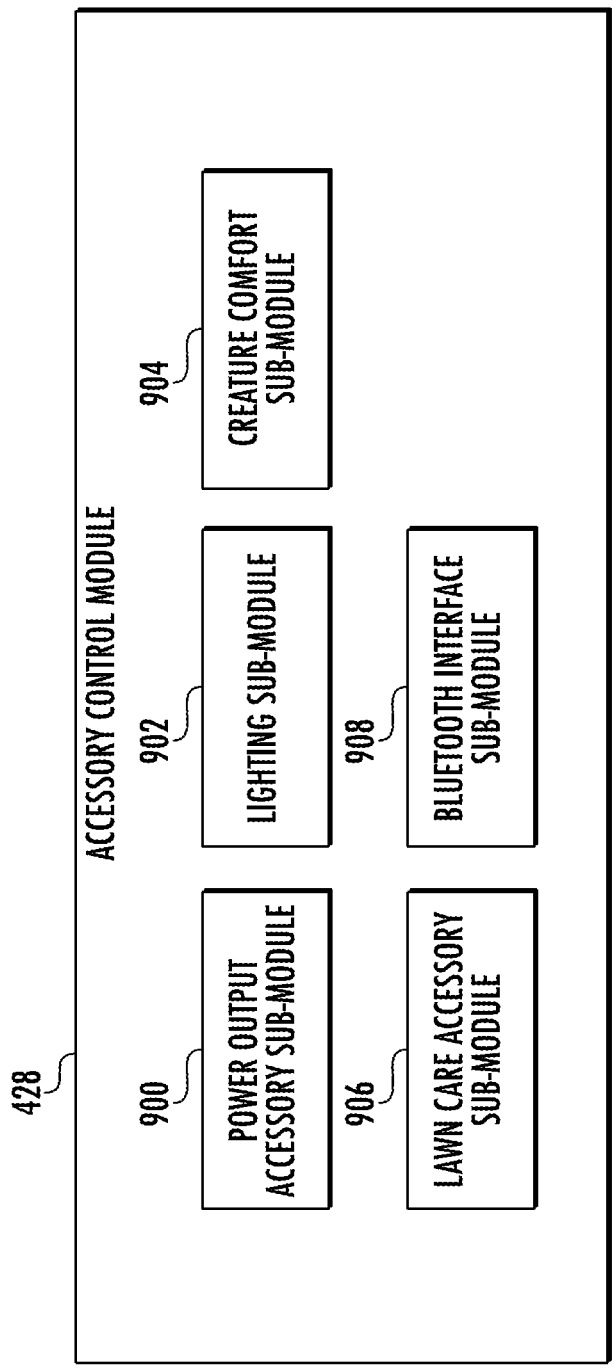
FIG. 9 is a schematic illustration of an accessory control module, according to some embodiments.

The accessory control module 428 may be configured to interface with one or more accessories associated with the ZTR 100. In some embodiments, the accessory control module 428 may include one or more sub-modules to control specific aspects of the accessories. As shown in FIG. 9, the sub-modules may include a power output accessory sub-module 900, a lighting sub-module 902, a creature comfort sub-module 904, a lawn care accessory sub-module 906, and a Bluetooth interface sub-module 908.

The power output accessory sub-module 900 may be configured to provide various power connections for use by the user. In some embodiments, the power output accessory sub-module 900 may be configured to control a voltage converter on the ZTR 100. The voltage converter may be configurable to modify the voltage level output by the batteries to a lower voltage usable by the user. For example, the voltage converter may be configured to reduce the higher voltage from the batteries 104 (e.g. 84 VDC) to a lower DC voltage, such a 5 VDC, −5 VDC, 12 VDC, −12 VDC, and the like. The voltage converter may be coupled to one or more auxiliary outlets to allow the user to plug in and provide power to one or more auxiliary devices, such as mobile phones, wireless headphones, wearable devices, etc. In some embodiments, the auxiliary outlets may be similar to Universal Serial Bus (USB) outlets. In some embodiments, the power output accessory sub-module 900 may communicate with the power converter to determine the proper voltage level, current level, etc. to provide to the one or more outlets. In some examples, The USB type outlets may further provide data connections to the controller 108. This can allow for the controller 108 and one or more auxiliary devices to communicate. In one embodiment, the USB outlet may support ODB connections to the controller by an external analytic device. In some embodiments, the power output accessory sub-module 900 may provide a DC voltage as a sufficient current output level to allow for jumpstarting of a fossil fuel based engine.

The power output accessory sub-module 900 may further be configured to interface with one or more voltage inverters associated with the ZTR 100. The voltage inverters may be configured to invert the DC voltage provided by the batteries 104 into an AC voltage. For example, the voltage inverters may be configured to convert an 84 VDC signal output from the batteries 104 into a 120 VAC signal. The AC signal may be provided to one or more outlets on the ZTR 100. The AC signal can be used by a user to power one or more AC devices. In some embodiments, the inverter may be rated at 500 W. In other embodiments, the inverter may be rated at 1000 W or higher. However, other power ratings are contemplated. The AC output may be configured to power multiple items such as power tools, entertainment devices, etc. In some embodiments, the inverter may be sufficient to power one or more household appliances via the batteries 104 during a power outage.

In some embodiments, the power output accessory sub-module 900 may be configured to provide power to an accessory power rail. The accessory power rail may provide power to one or more accessory devices, such as those describe herein. In some embodiments, the accessory power rail may further include one or more data busses as well for providing communication with the one or more accessories.

The lighting sub-module 902 may be configured to control one or more lights associated with the ZTR 100. The lighting sub-module 902 may be configured to interface with the accessory rail described above, which can allow for one or more lights to be connected to the accessory rail as needed. The lighting sub-module 902 may provide instructions to the one or more lights connected to the auxiliary rail to control the lights.

The creature comfort sub-module 904 may be configured to control one or more accessories associated with user comfort. In one embodiment, the creature comfort sub-module 904 may control one or more heating devices associated with the ZTR 100, such as heated seats, heated grips, etc. In some embodiments the creature comfort sub-module 904 may provide power to the heating devices based on a user input. The creature comfort sub-module 904 may further be able to monitor the temperature of the heating devices and control the power accordingly to avoid overheating the heating devices. In some embodiments, the heating devices may be electrical heaters (e.g. resistive heaters). However, in some embodiments, the ZTR 100 may capture waste heat generated by the various systems (e.g. via regenerative braking) and the creature comfort sub-module 904 may utilize this captured waste heat to power the heating devices.

The creature comfort sub-module 904 may be further configured to control one or more cooling devices, such as cooled seats, cooling fans, cooled cup holders, etc. In some embodiments, the cooling devices may be connected to the accessory rail, which can allow for the creature comfort sub-module 904 to communicate and control the various cooling devices. The creature comfort sub-module 904 may be configured to control the cooling devices based on user input via the user interface 110 and/or a user device. The creature comfort sub-module 904 may further be configured to control an electronic insect extermination device (e.g. a bug zapper). The creature comfort module 904 may further be configured to interface with one or more speakers and microphones on the ZTR 100 to provide an active noise cancelling function. For example, the creature comfort module 904 may utilize phase cancellation (e.g. outputting sound received via the microphones at 180 degrees out of phase) to reduce the sound heard by the user. In other embodiments, the creature comfort module 904 may interface with a headset worn by the user to provide the active noise cancelling functions. In still further examples, the creature comfort sub-module may be configured to store seat adjustments of various users, and automatically position the seat based on the user operating the ZTR 100.

The lawn care accessory sub-module 906 may be configured to control one or more accessories attached to the ZTR 100 that are related to lawn care. In some embodiments, the lawn care accessories may be connected to the accessory rail described above. In other embodiments, a separate attachment accessory rail may be used to power and communicate with the lawn care accessories. The accessory rail and/or attachment accessory rail can allow for multiple attachments to be attached to the ZTR 100 and controlled by the controller 108. The lawn care accessory sub-module 906 may be configured to control various lawn care attachments, such as sprayers, dump gates, edgers, overseeders, snow heaters, etc.

The Bluetooth interface sub-module 908 may be configured to interface with one or more Bluetooth devices, such as a cellular phone. The Bluetooth interface sub-module 908 may communicate with one or more Bluetooth devices via the wireless communication interface 416. In some embodiments, the Bluetooth interface sub-module 908 may be configured to allow for the user to receive or place phone calls via the ZTR 100, such as via user interface 110. The Bluetooth interface sub-module 908 may further allow for the user to send and receive text messages (SMS, MMS, etc.) via the user interface 110. In some embodiments, the Bluetooth interface sub-module 908 may allow a user device to communicate with the controller 108 via Bluetooth. In some embodiments, the user may be able to request service via a smartphone application, and the application may access certain data from the controller 108 via the Bluetooth interface sub-module 908, which may then be provided to the proper service personnel. In other configurations, dealer alert messages may be transmitted to the user device via Bluetooth, and transmitted to the dealer via the user device.

In some embodiments, a user device, such as a smartphone, may be used to identify a user via Bluetooth. This can allow for the controller 108 to configure the ZTR 100 based on a user profile associated with the user. In some embodiments, the user may be able to create or modify a user profile on the user device, which may then be communicated to the controller via Bluetooth. In some embodiments, the ZTR 100 may be enabled via a user device over the Bluetooth connection.

The IoT module 430 module may be configured to interface with one or more remote devices via the wireless communication interface 416. In some embodiments, the IoT module 430 may be configured to communicate with the cloud-based server 418 via the wireless communication interface 416. The cloud-based server 418 may be configured to interface with multiple programs and interfaces, and be accessible via the World Wide Web (e.g. the Internet). This can allow a user to access the controller 108 via any device that has access to the World Wide Web. For example, a user may be able to access the controller 108 via a mobile device such as an internet connected computer, a smartphone (e.g. iPhone, Android phone, Windows phone), a tablet computer (e.g. iPad, Android Table, Microsoft Surface, etc.), or any other internet connected device. In some embodiments, the cloud-based server 418 may provide one or more web-based applications for interfacing between a user device and the controller 108, and thereby the ZTR 100. In other embodiments, the user's device may include a client-side application, which can interface with the controller 108 via the cloud-based server 418. In still further embodiments, the user's device may include one or more client-side applications which can be configured to communicate directly to the controller 108 via the wireless communication interface 416, such as via Bluetooth, BLE, NFC, Zigbee, etc.

The IoT module 430 may include one or more software applications configured to process data or instructions received via the wireless communication interface 416. In some embodiments, the IoT module 430 may process data provided by one of the above described software modules 420-428, and provide that data to a user device or to the cloud-based server 418 via the wireless communication interface 416.

The IoT module 434 may communicate with the cloud-based server 418 to allow for one or more applications related to the ZTR 100 to be executed. One application may be a monitoring application for use by a commercial cutter to monitor certain aspects of one or more ZTRs 100 mowers in a given fleet. The monitoring application may further be for use by a homeowner to monitor the location and/or status of their ZTR 100. For example, the IoT module 430 may transmit location data provided by the sensor sensors 102 (e.g. GPS sensors) to the cloud-based server 418. Thus, a user may be able to access location information for one or more ZTRs 100 via the cloud-based server 418. In further embodiments, the IoT module 430 may transmit various operating parameters relative to the ZTR 100 to the cloud-based server 418. A user may then access the operating parameters via the cloud-based server 418. Operating parameters may include battery parameters (voltage level, state-of-charge "SoC," state-of-health "SoH," average power and/or current draw, time since last charge, etc.), ZTR 100 parameters (speed, temperatures, motor current draw, implement speed, estimated time to completion, etc.), environmental parameters (grass height, moisture levels, outdoor light levels, etc.), errors, and other parameters as applicable. In some embodiment, different users having different permission levels may be able to access different operating parameters. For example, a user responsible for interfacing directly with an individual ZTR 100 may have access to some operational parameter information, while a user responsible for monitoring the entire fleet of ZTRs 100 may have access to other operational parameter information.

In some embodiments, the IoT module 430 may transmit other lawn characteristic data to the cloud-based server 418 for evaluation. For example, the IoT module may transmit information related to the number or percentage of weeds associated with a given lawn, which may be detected via a weed sensing sensor on the ZTR 100. The IoT module 430 may also allow for remote activation or deactivation of the ZTR 100 via the cloud-based server 418. This can allow for an owner of the ZTR 100 to have control over the operation of the ZTR, which may be used upon theft, safety situations, or where a user of the ZTR 100 is no longer authorized to operate the ZTR 100.

Figure 10:
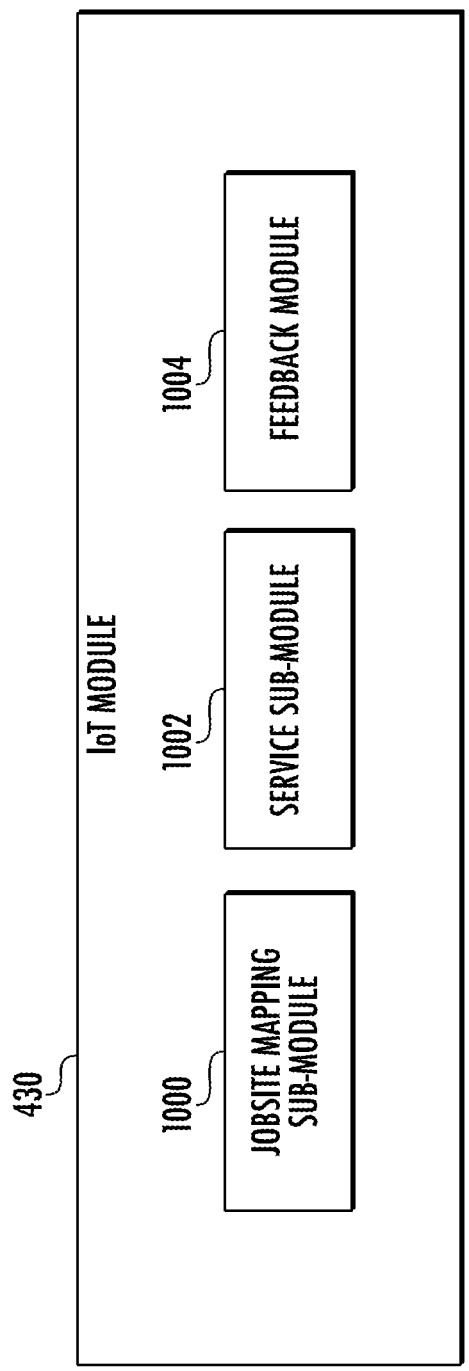
FIG. 10 is schematic illustration of an Internet of Things (IoT) control module, according to some embodiments.

As shown in FIG. 10, the IoT module 430 may include a number of sub-modules, such as a jobsite mapping sub-module 1000, a service sub-module 1002, and a feedback module 1004. The jobsite mapping module may be used by a commercial cutter to map one or more jobsites via GPS data. This information can be provided to the operator of the ZTR 100, either via the user interface 110 and/or a user device. In some embodiments, the jobsite mapping sub-module 1000 may communicate the jobsite GPS data to the cloud-based server 418, which may include an optimization program configured to generate an optimized route based on the GPS data associated with the jobsites. The optimization program may optimize the route based on available battery power, optimal distances, traffic patterns, average lawn growth rates, lawn priority, etc.

The service sub-module 1002 may be configured to communicate service information provided by the controller 108 to a dealer and/or owner. Further, the service sub-module 1002 may further be configured to allow for service alerts to be pushed to owners from a dealer or manufacturer. The service alerts may be provided to a user device, or may be displayed on the user interface 110. In some embodiments, the service sub-module 1002 may be configured to interface with a warranty system in the cloud-based server 418. The warranty system may receive various information via the IoT module 430, such as operating parameters, maintenance practices, etc. Based on the data, the warranty system may be configured to provide the user with dynamic warranty information based on the analyzed data. For example, where a user is found to meet certain parameters (not operating outside limits, performing regular maintenance, etc.), the warranty system may extend or improve a warranty available to the owner. Alternatively, where the user is not found to meet certain parameters (operating outside limits, not regularly performing required maintenance), the warranty system may decrease the coverage of the warranty, and/or increase the cost to maintain the warranty.

The feedback sub-module may allow for certain feedback data to be provided to the dealer and/or manufacturer. Feedback may include marketing data, maintenance data, etc. In some embodiments, the user may be able to directly provide feedback, such as user suggestions or improvements, via the user interface 110 and/or a user device.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. It may be possible for various steps in described methods to be undertaken simultaneously or in other orders than specifically provided.

What is claimed is:

1. Ride-on outdoor power equipment, comprising:
   a plurality of batteries each being configured to be removed without the use of a tool;
   one or more electric traction motors electrically connected to the plurality of batteries;
   one or more user input devices;
   an on-board plug-in battery charger electrically connected to the plurality of batteries and configured to provide power to the plurality of batteries via a plug from a utility connection;
   a plurality of sensors; and
   a controller in communication with the plurality of batteries, the electric traction motors and the one or more user input devices, the controller configured to:
      control the electric traction motors to operate the ride-on outdoor power equipment based on inputs received via the user input devices;
      determine a state of charge of at least one of the plurality of batteries; and provide power to the at least one of the plurality of batteries or a discharge device based on the determined state of charge.

2. The ride-on outdoor power equipment of claim 1, wherein one or more of the electric traction motors are configured to control a lateral rotational position of a non-traction wheel.

3. The ride-on outdoor power equipment of claim 1, wherein the controller comprises a processing circuit, a user interface, an input/output (I/O) interface, and a communication module.

4. The ride-on outdoor power equipment of claim 3, wherein the communication module comprises one or more of a serial communication interface and a wireless communication interface.

5. The ride-on outdoor power equipment of claim 4, wherein the processing circuit comprises a traction control module configured to control the electric traction motors.

6. The ride-on outdoor power equipment of claim 5, wherein the traction control module is further configured to control one or more non-traction motors electrically connected to the plurality of batteries.

7. The ride-on outdoor power equipment of claim 5, wherein the traction control module is further configured to execute one or more automatic turning functions to alter the direction of the ride-on outdoor power equipment.

8. The ride-on outdoor power equipment of claim 3, wherein the processing circuit comprises an implement control module configured to operate one of an implement or a mower deck.

9. The ride-on outdoor power equipment of claim 8, wherein the implement control module is configured to communicate with one or more sensors associated with the implement or the mower deck.

10. The ride-on outdoor power equipment of claim 1, further comprising an attachment deck.

11. The ride-on outdoor power equipment of claim 10, further comprising a power and communication bus, the power and communication bus configured to provide power and communication to the attachment deck.

12. Ride-on outdoor power equipment, comprising
a plurality of batteries each being configured to be removed;
one or more electric motors electrically connected to the plurality of batteries;
one or more user input devices;
an on-board plug-in battery charger electrically connected to the plurality of batteries and configured to provide power to the plurality of batteries via a plug from a utility connection;
a plurality of sensors; and
a controller comprising a traction control module and an operational control module communicably coupled to the one or more electric motors.

13. The ride-on outdoor power equipment of claim 12, wherein the traction control module is communicably and operatively coupled to the one or more electric motors to control the one or more electric motors and a lateral rotational position of a non-traction wheel.

14. The ride-on outdoor power equipment of claim 12, wherein the operational control module is communicably and operatively coupled to the one or more electric motors and controls the speed of the one or more electric motors to provide a steering assist function; wherein the on-board plug-in battery charger is configured to receive power via at least one of an electrical plug, an inductive charger receiver, or regenerative braking via the one or more electric motors.

15. The ride-on outdoor power equipment of claim 12, further comprising one or more communication antennas electrically coupled to the controller and configured to provide communication to the controller via one or more wireless protocols.

16. The ride-on outdoor power equipment of claim 1, wherein each of the plurality of batteries weight less than 20 pounds.

17. The ride-on outdoor power equipment of claim 16, wherein each of the plurality of batteries is configured to provide approximately one kilowatt-hour of energy.

18. The ride-on outdoor power equipment of claim 1, wherein the plurality of batteries is configured to cumulatively provide between two kilowatt-hours of energy and three kilowatt-hours of energy or between three kilowatt-hours of energy and four kilowatt-hours of energy.

19. The ride-on outdoor power equipment of claim 12, wherein each of the plurality of batteries weight between approximately 13 pounds and approximately 15 pounds.

20. The ride-on outdoor power equipment of claim 19, wherein each of the plurality of batteries is configured to provide approximately one kilowatt-hour of energy, and wherein the plurality of batteries is configured to cumulatively provide between two kilowatt-hours of energy and three kilowatt-hours of energy or between three kilowatt-hours of energy and four kilowatt-hours of energy.

* * * * *